United States Patent
Oswald et al.

(10) Patent No.: US 11,675,937 B2
(45) Date of Patent: Jun. 13, 2023

(54) METHOD FOR SIMULATION-BASED ANALYSIS OF A MOTOR VEHICLE

(71) Applicant: AVL LIST GMBH, Graz (AT)

(72) Inventors: Mario Oswald, Fernitz (AT); Peter Schoeggl, Hitzendorf (AT); Erik Bogner, Graz (AT); Robert Schuh, Ludwigsburg (DE); Moritz Stockmeier, Tamm (DE); Volker Mueller, Lichtenstein (DE); Mario Teitzer, Graz (AT); Thomas Gerstorfer, Graz (AT); Hans-Michael Koegeler, Graz (AT)

(73) Assignee: AVL List GmbH, Graz (AT)

( * ) Notice: Subject to any disclaimer, the term of this patent is extended or adjusted under 35 U.S.C. 154(b) by 1070 days.

(21) Appl. No.: 16/317,193

(22) PCT Filed: Jul. 12, 2017

(86) PCT No.: PCT/EP2017/067596
§ 371 (c)(1),
(2) Date: Jul. 2, 2019

(87) PCT Pub. No.: WO2018/011292
PCT Pub. Date: Jan. 18, 2018

(65) Prior Publication Data
US 2019/0318051 A1 Oct. 17, 2019

(30) Foreign Application Priority Data

Jul. 13, 2016 (AT) .............................. A 50628/2016

(51) Int. Cl.
*G06F 30/20* (2020.01)
*G01M 17/007* (2006.01)
(Continued)

(52) U.S. Cl.
CPC ............ *G06F 30/20* (2020.01); *G01M 17/007* (2013.01); *G05B 17/02* (2013.01); *G06F 30/15* (2020.01);
(Continued)

(58) Field of Classification Search
CPC .......... G06F 30/20; G06F 30/15; G06F 30/25; G06F 30/27; G06F 30/28; G06F 2111/00;
(Continued)

(56) References Cited

U.S. PATENT DOCUMENTS

| 5,752,211 A | * | 5/1998 | Takasaki | ............ | B60K 23/0808 701/88 |
| 7,039,541 B2 | * | 5/2006 | Grunbacher | ........ | G01M 15/044 701/33.9 |

(Continued)

FOREIGN PATENT DOCUMENTS

| AT | 500978 | 5/2006 |
| CN | 104102781 | 10/2014 |

(Continued)

OTHER PUBLICATIONS

International Search Report prepared by the European Patent Office dated Sep. 29, 2017, for International Application No. PCT/EP2017/067596.

(Continued)

*Primary Examiner* — Kibrom K Gebresilassie
(74) *Attorney, Agent, or Firm* — Sheridan Ross P.C.

(57) ABSTRACT

The invention relates to a method for simulation-based analysis and/or optimization of a motor vehicle, preferably having the following working steps:
simulating (SIOI) a driving operation of the motor vehicle (I) on the basis of a model (M) with at least one manipulated variable for acquiring values of at least one simulated variable which is suitable for character-
(Continued)

Figure 1:
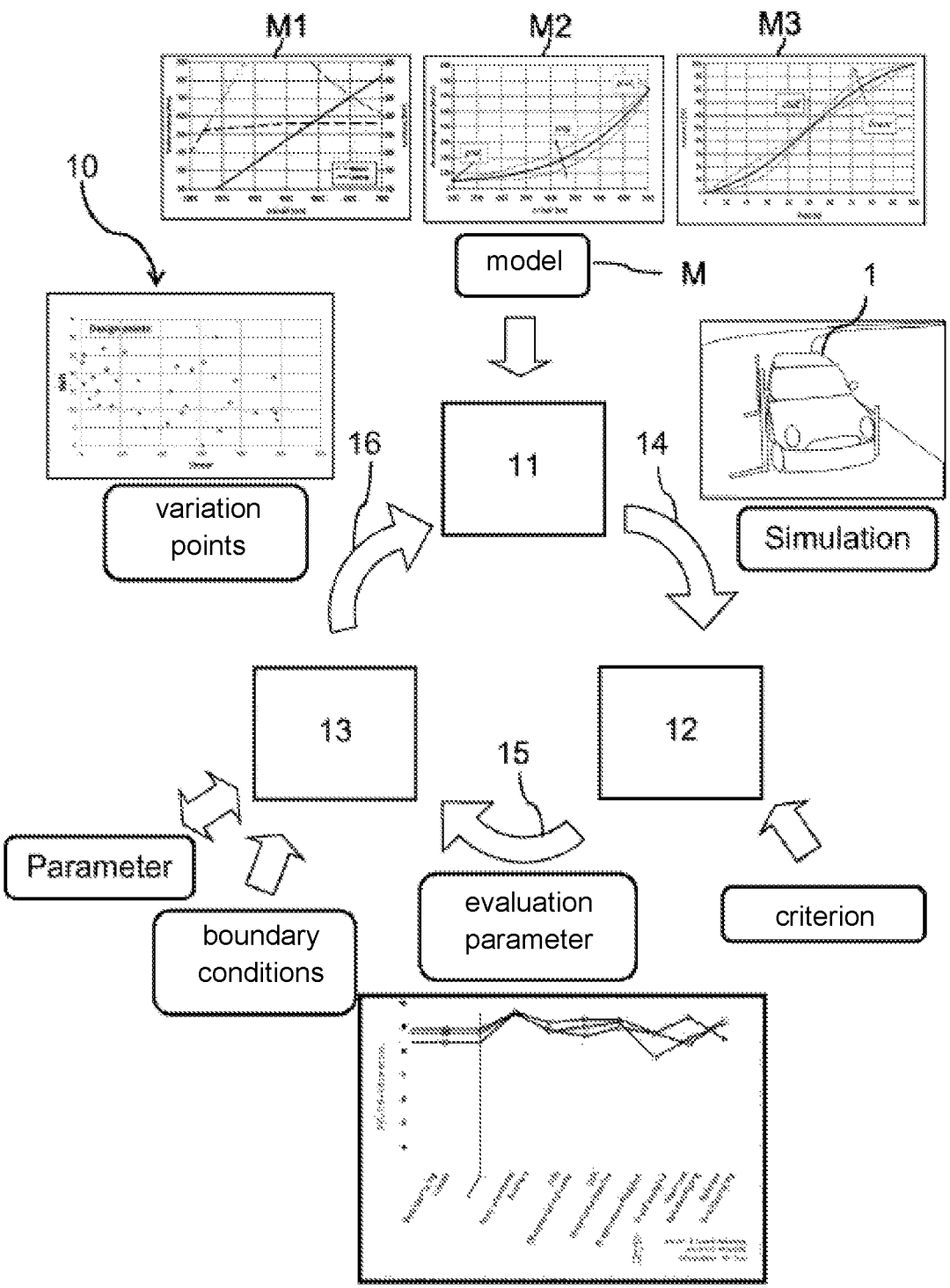

izing an overall vehicle behaviour, in particular a driving capability, of the motor vehicle (I), wherein the model has at least one partial model, in particular a torque model, and wherein the at least one partial model is based on a function and preferably characterizes the operation of at least one component, in particular of an internal combustion engine of the motor vehicle (I); and—outputting (S 103) the values of the at least one simulated variable.

31 Claims, 8 Drawing Sheets

(51) Int. Cl.
*G05B 17/02* (2006.01)
*G06F 30/15* (2020.01)
*G06F 111/00* (2020.01)
*G06F 30/25* (2020.01)
*G06F 30/27* (2020.01)
*G06F 119/22* (2020.01)
*G06F 30/28* (2020.01)

(52) U.S. Cl.
CPC .............. *G06F 30/25* (2020.01); *G06F 30/27* (2020.01); *G06F 30/28* (2020.01); *G06F 2111/00* (2020.01); *G06F 2119/22* (2020.01)

(58) Field of Classification Search
CPC ... G06F 2119/22; G01M 17/007; G05B 17/02
See application file for complete search history.

(56) References Cited

U.S. PATENT DOCUMENTS

| | | | | |
|---|---|---|---|---|
| 8,136,615 B2* | 3/2012 | Pels | ...................... | B60W 10/02 180/65.285 |
| 2007/0216166 A1* | 9/2007 | Schubert | ............... | F03D 7/0224 290/55 |
| 2010/0023202 A1* | 1/2010 | Schoeggl | ............ | G01M 17/007 701/31.4 |
| 2010/0131135 A1* | 5/2010 | Jaensch | .................. | G05B 17/02 701/22 |
| 2011/0172897 A1* | 7/2011 | Tsuzuki | ................. | F02D 41/40 701/102 |
| 2011/0191079 A1* | 8/2011 | Rzehorska | .......... | G01M 17/007 703/8 |
| 2011/0313628 A1* | 12/2011 | Chinbe | .................. | F02D 29/02 701/54 |
| 2013/0008416 A1* | 1/2013 | Nagatsu | .............. | F02D 13/0265 123/568.11 |
| 2013/0019828 A1* | 1/2013 | Nagatsu | ................ | F02D 41/006 123/90.15 |
| 2013/0066534 A1* | 3/2013 | Foussard | ................ | G16Z 99/00 701/101 |
| 2013/0199284 A1* | 8/2013 | Clusserath | .......... | G01M 17/007 73/116.01 |
| 2015/0168259 A1* | 6/2015 | Hofmann | ................ | B60L 50/40 73/118.02 |
| 2016/0006752 A1* | 1/2016 | Wilding | .............. | H04L 63/0245 701/26 |
| 2016/0010539 A1* | 1/2016 | Verdoorn | .............. | F02B 37/162 60/600 |
| 2016/0016586 A1* | 1/2016 | Banerjee | ............... | B60W 30/14 701/94 |
| 2016/0133064 A1* | 5/2016 | Patino | ...................... | G07C 5/08 701/29.1 |
| 2018/0284774 A1* | 10/2018 | Kawamoto | ........... | B60W 50/10 |

FOREIGN PATENT DOCUMENTS

| | | |
|---|---|---|
| DE | 60218829 | 1/2008 |
| DE | 102009013291 | 9/2010 |
| EP | 0846945 | 6/2002 |
| EP | 1623284 | 8/2008 |
| JP | 2003-186917 | 7/2003 |

OTHER PUBLICATIONS

Nessler "Optimierungsstrategien in der modellbasierten Dieselmotorenentwicklung," Elektrotechnik und Informatik der Technischen Universität Berlin, Feb. 2015, 165 pages [retrieved online from: depositonce.tu-berlin.de/bitstream/1303/4841/1/Nessler_Adrian.pdf].
Official Action for European Patent Application No. 17737818.9, dated May 26, 2020, 10 pages.
Millo et al. "Numerical Simulation to Improve Engine Control During Tip-In Maneuvers," SAE Technical Paper Series, vol. 1, Mar. 3, 2003, 38 pages.
Smith et al. "The Horsepower Reserve Formulation of Driveability for a Vehicle Fitted with a Continuously Variable Transmission," Vehicle System Dynamics: International Journal of Vehicle Mechanics and Mobility, Jan. 2004, vol. 41, No. 3, pp. 157-180.
Official Action for Austria Patent Application No. 50628/2016, dated May 8, 2017, 3 pages.
Official Action with machine translation for China Patent Application No. 201780055974.1, dated Oct. 21, 2022, 16 pages.

* cited by examiner

METHOD FOR SIMULATION-BASED ANALYSIS OF A MOTOR VEHICLE

CROSS REFERENCE TO RELATED APPLICATIONS

This application is a national stage application under 35 U.S.C. 371 and claims the benefit of PCT Application No. PCT/EP2017/067596 having an international filing date of 12 Jul. 2017, which designated the United States, which PCT application claimed the benefit of Austria Patent Application No. A50628/2016 filed 13 Jul. 2016, the entire disclosures of which are herein incorporated by reference.

The invention relates to a method for the simulation-based analysis and/or optimization of a motor vehicle, wherein a driving operation of the motor vehicle is simulated on the basis of a model and a driving mode parameter determined which is defined in relation to one or more values of at least one simulated variable and/or at least one manipulated variable and is suited to characterizing at least one driving mode, in particular a driving state of the motor vehicle.

Substantially increase the expense involved in calibrating motor vehicles are an increasing number of manipulated or input variables along with output values, increased demands from consumers as to motor vehicle performance as well as from legislators on motor vehicle emission and consumption.

In particular the designing of an engine, for example an internal combustion engine, and the calibrating of its control is a costly endeavor and cannot actually be optimized in terms of criteria such as vehicle performance, emission and consumption until a prototype of the vehicle exists. At the same time, auto manufacturers are under increasing pressure to shorten new vehicle development times as a result of technical innovations and shorter product cycles.

In order to satisfy both conflicting trends, improved methods of development are necessary which enable projecting the effect that the design of individual components will have on the overall vehicle characteristics with sufficient accuracy.

Known from the EP 0 846 945 B1 document is a method for analyzing the driving style of motor vehicles which has the following steps:
preparing a simulation model for a vehicle in order to simulate the vehicle on a dynamic test stand;
conducting tests on the test stand to obtain measured variables on the driving style of the simulated vehicle;
continuously monitoring to check whether predefined trigger conditions are fulfilled; i.e. a set of measured variables corresponding to the predefined driving states of the motor vehicle;
only if one of the trigger conditions is fulfilled, computing at least one evaluation parameter representative of vehicle driving capability from one or more measured values based on a predefined functional relationship;
outputting the evaluation parameter.

Known from the EP 1 623 284 A1 document is a method for optimizing motor vehicles and engines for driving such vehicles which has the following steps:
conducting measurements during actual operation of the vehicle on the road or on a roller type test stand or of the engine on an engine test stand;
parameterizing a simulation model representative of the vehicle or engine so as to be able to calculate a prediction about the measured values obtained by means of the measurements;
simulating the vehicle using the simulation model, wherein at least one driving capability index is additionally calculated which is obtained from several measured values based on an empirically determined function and indicates the driving capability of a vehicle in a specific driving state;
optimizing the vehicle settings during the above simulation, wherein at least one driving capability index is input into the target function or boundary conditions of the optimization.

It is a task of the invention to provide an improved method and associated system for simulation-based analysis and/or optimization of a motor vehicle. In particular a task of the invention is that of providing such a method and system which is able to execute an automated optimization process.

This task is solved by the method according to claim 1 and the system according to claim 24. Advantageous configurations are claimed in the subclaims. The wording of the claims is hereby made a contextual part of the description.

A first aspect of the invention relates to a method for simulation-based analysis and/or optimization of a motor vehicle, preferably having the following working steps:
simulating a driving operation of the motor vehicle on the basis of a model with at least one manipulated variable for acquiring values of at least one simulated variable suitable for characterizing an overall vehicle behavior, in particular a driving capability, of the motor vehicle, wherein the model
comprises at least one partial model and wherein the at least one partial model is based on a function and preferably characterizes the operation of at least one component, in particular an internal combustion engine of the motor vehicle;
determining a driving mode parameter defined in relation to one or more values of at least one simulated variable and/or at least one manipulated variable and suited to characterizing at least one driving mode, in particular a driving state of the motor vehicle; and
outputting the values of the at least one simulated variable suited to characterizing the overall vehicle behavior in conjunction with the respectively associated driving mode parameter.

A second aspect of the invention relates to a system for simulation-based analysis and/or optimization of a motor vehicle which is configured to realize a method according to the first aspect of the invention and/or preferably comprises the following means:
means configured to simulate a driving operation of the motor vehicle on the basis of a model with at least one manipulated variable for acquiring values of at least one simulated variable suitable for characterizing an overall vehicle behavior, in particular a driving capability, of the motor vehicle, wherein the model has at least one partial model and wherein the at least one partial model is based on a function and preferably characterizes the operation of at least one component, in particular an internal combustion engine of the motor vehicle; and means configured to determine a driving mode parameter defined by values of at least one simulated variable and/or at least one manipulated variable and suited to characterizing at least one driving mode, in particular a driving state of the motor vehicle; and
means configured to output the values of the at least one simulated variable suited to characterizing the overall vehicle behavior in conjunction with the respectively associated driving mode parameter.

Preferably, the means are allocated to a first and a second module connected by a first data interface.

A third aspect of the invention relates to a method for simulation-based analysis and/or optimization of a motor vehicle which has the following working steps:
  simulating a driving operation of the motor vehicle on the basis of a model with at least one manipulated variable for acquiring values of at least one simulated variable suitable for characterizing an overall vehicle behavior, in particular a driving capability, of the motor vehicle, wherein the model has at least one partial model, in particular a torque model, and wherein the at least one partial model is based on a function and preferably characterizes the operation of at least one component, in particular an internal combustion engine of the motor vehicle; and
  outputting the values of the at least one simulated variable.

A fourth aspect of the invention relates to a system for simulation-based analysis and/or optimization of a motor vehicle which is configured to realize a method according to the invention and/or comprises:
  means configured to simulate a driving operation of the motor vehicle on the basis of a model with at least one manipulated variable for acquiring values of at least one simulated variable suitable for characterizing an overall vehicle behavior, in particular a driving capability, of the motor vehicle, wherein the model comprises at least one partial model, in particular a torque model, and wherein the at least one partial model is based on a function and preferably characterizes the operation of at least one component, in particular an internal combustion engine of the motor vehicle; and
  means configured to output the values of the at least one simulated variable.

Preferably, the means are allocated to a first and a second module connected by a first data interface.

Further aspects of the invention relate to a computer program and a computer-readable medium.

The features and advantages of the advantageous configuration of the first aspect of the invention described below also apply accordingly to the advantageous configurations of the invention's second and further aspects and vice versa. Unless expressly excluded, the advantageous configurations can thereby be combined with one another in any desired manner.

A variable in the sense of the invention is a simulation variable which in particular comprises at least one manipulated or respectively input variable and at least one simulated "measured variable" or respectively output variable. Preferably, a variable is a physical variable.

A condition in the sense of the invention is one or more sets of values of a plurality of variables and/or a value progression of one or more variables.

A model in the sense of the invention is a depiction of reality, in particular simplified. A model according to the invention may also denote an analogous model for a device's operation. Preferably, it can in turn comprise partial models and/or sub-models modeling individual components of the device. Such a model may thereby comprise a characteristic map-based model and/or a function-based model, particularly as partial models. In simulation with a characteristic map-based model, a map assigning values of an input variable to values of an output variable is stored. In simulation by means of a function-based model, a function is stored with function parameters or respectively coefficients and variables which assign values of input variables to values of output variables.

A function parameter or also a parameter of a function in the sense of the invention is a so-called form variable which is constant in the current case being regarded but may vary in the next case. A function parameter is thereby an individual value or an individual function and can in particular represent a coefficient.

Output in the sense of the invention is providing for further processing, particularly in the method or in another method, or a reproduction via a user interface.

Overall vehicle behavior in the sense of the invention is at least one property of the vehicle in motion or driving operation respectively, in particular selected from among the following group: function of the assistance systems, sense of safety, driving comfort, agility, driving capability/drivability, emissions, efficiency, NVH behavior, vehicle turning response/in relation to the vehicle, particularly in the overall context.

Driving capability in the sense of the invention is motor vehicle behavior in transient operating states effected by an action of a driver or driver assistance system.

A driving mode in the sense of the invention characterizes a motor vehicle's operation at one point in time or over a period of time and in simple form can be a driving state. In particular, a driving mode is an overall state of operation of the vehicle which characterizes the driving state as well as the operating state of the vehicle's structural components and auxiliary components used in propulsion.

An operating state in the sense of the invention is any operational possibility of an apparatus. In the example of an internal combustion engine, operating state preferably means both operation of the internal combustion engine in a stationary condition; i.e. for example idling operation, or operation in the vehicle at constant speed and constant load, as well as operation in a stationary or transient condition; i.e. for example an acceleration of the internal combustion engine. An operating state is thereby preferably both a snapshot of a set of variable values as well as alternatively being a chronological sequence of the variable values, e.g. the accelerator pedal position, or also alternatively defined by a start and end point of the values of variables, for example velocity values at a predetermined degree of opening to the throttle valve.

A value in the sense of the invention is a number, a set of numbers or also an expression.

Operational behavior in the sense of the invention is a succession of operating states.

A driving state in the sense of the invention characterizes a dynamic of a motor vehicle in motion or respectively in driving operation. Examples of driving states are preferably starting sequence of an internal combustion engine in driving operation ($v_{vehicle} > 0$), acceleration, tip-in, tip-out, deceleration, gear change, coasting at a constant speed, gliding, idling while in driving operation ($v_{vehicle} > 0$), engine stop while driving ($v_{vehicle} > 0$). A driving state can also be further subdivided into sub-driving states. In extreme cases, each combination of variable values is associated with one sub-driving state. A driving state thereby relates preferably to stationary and transient/dynamic conditions of the driving operation which indicate the transition from a first stationary driving state to a second stationary driving state.

Efficiency in the sense of the invention is a measure of the energy expended in achieving a defined benefit. A process is particularly efficient when a specific benefit is achieved with minimum expenditure of energy. Preferably, a degree of efficiency is at least one component part of the efficiency.

Emission behavior in the sense of the invention is an emission sequence over a given period of time or respectively an emission sequence over a given distance, whereby time and distance are in particular coupled via a velocity profile.

A module in the sense of the invention is a component or element of the inventive system. Individual modules can be technically realized as hardware and/or software and are connected by interfaces.

Means in the sense of the invention can be technically formed as hardware and/or software, in particular a particularly digital processing unit, particularly a microprocessor unit (CPU), preferably data/signal connected to a memory and/or bus system and/or comprising one or more programs. The CPU can thereby be selected to process commands implemented as a program stored in a memory system, acquire input signals from a data bus and/or output signals to a data bus. A memory system can comprise one or more, in particular different storage media, particularly optical, magnetic, fixed and/or other non-volatile media. The program can be provided in such a manner as to be capable of embodying or executing the methods described herein such that the CPU can execute the steps of such methods and can thereby in particular control and/or monitor a reciprocating piston engine.

A motor vehicle in the sense of the invention is a vehicle operated by a drive system. A motor vehicle is in particular a land vehicle, a watercraft or an aircraft. Preferably, it is a passenger car, a freight vehicle, a bus or a motorcycle.

The invention is in particular based on the approach of making the overall vehicle behavior, in particular the motor vehicle driving capability, analyzable and optimizable in a full simulation. The motor vehicle's driving operation is thereby simulated by a model such that no measuring ensues of an actual motor vehicle nor on a test stand in order to obtain monitored variable values.

The model which depicts the motor vehicle is thereby either a completely function-based model or comprises, at least for the component to be configured in a method cycle, a function-based partial model illustrating said component. In this case, further vehicle components can also be contained in the model as characteristic map-based partial models in order to run the simulation.

Preferably, the values of the simulated variables are set in relation to a driving mode, in particular a driving state of the motor vehicle. Thus, a driving mode parameter is determined according to the invention on the basis of the variables simulated by means of the model. So doing enables additionally improving the information on the overall vehicle behavior.

Values of the simulated variables and if necessary the respective driving mode parameter will thereupon preferably be output, for example in order to be displayed to a user via a user interface or in order to provide a modeling algorithm which can modify, in particular further optimize, the model, in particular the function-based components of the model. So doing enables the invention to optimize individual components or an entire motor vehicle in terms of specific criteria in consideration of boundary conditions. The individual components or the entire vehicle can then be configured on the basis of the model obtained.

In particular, the same variable values or sets of variable values can thereby be evaluated differently as a function of the respectively given driving mode parameter.

In one advantageous configuration, the driving mode parameter is defined by at least one predetermined condition in relation to the at least one manipulated variable and/or at least one simulated variable. Evaluating a condition enables predefining in particular driving modes or driving states and then only outputting a driving mode parameter when such a predefined driving mode or driving state actually exists. Also in this case, the method is preferably then only continued when a predefined driving mode or driving state is present; in particular, only in this case is an evaluation parameter calculated. This enables reducing the allocated storage and computing capacity of a data processing device.

In a further advantageous configuration of the method according to the invention, the simulation working step is performed for variation points of an experimental design, in particular a statistical experimental design, which simulates the values of the input variables or respectively manipulated variables of the model. Utilizing a statistical experimental design, which can be created on the basis of known mathematical methods, enables a substantial reduction in the number of variation points needed for a simulation of the driving operation of the motor vehicle, particularly with respect to a so-called grid measurement.

In a further advantageous configuration, the inventive method further comprises the following working steps:
   determining a value of at least one evaluation parameter which indicates the overall vehicle behavior of the motor vehicle based on an assignment rule, in particular a function dependent on the at least one output simulated variable and the driving mode parameter; and
   outputting the value of the at least one evaluation parameter.

Correspondingly, the system according to the invention comprises in one advantageous configuration:
   means configured to determine at least one evaluation parameter which indicates the overall vehicle behavior of the motor vehicle based on an assignment rule, in particular a function dependent on the at least one simulated variable output and the driving mode parameter, and wherein the output means is further configured to output the at least one evaluation parameter.

Utilizing an evaluation algorithm which depends on the simulated variable and the driving mode parameter, wherein preferably considered in each case is the value of the driving mode parameter present with a value of the at least one simulated variable, enables quantifying the overall vehicle behavior of the simulated motor vehicle on the basis of a preferably objective assessment factor, for example ratings.

The assignment rule, which can in particular be a function or an allocation table, thereby assigns the overall vehicle behavior an evaluation parameter value as a function of the simulated variable and the driving mode parameter. The assignment rule can thereby preferably be based on generally acknowledged correlations or even on dependencies constructed on the basis of one or preferably a plurality of reference vehicles. In particular, the assignment rule can thereby factor in subjective perceptions of an occupant of the vehicle derived from different sets of simulated variables and driving mode parameters.

An important consideration is thereby in particular that the simulated variables subject to the driving mode parameter, i.e. in particular the current driving state, be assessed differently in order to determine the evaluation parameter which indicates the overall vehicle behavior of the vehicle. By establishing this correlation, a conclusion can be drawn as to whether the values or a sequence of the at least one simulated variable drawn on in the evaluation are sound or poor.

In particular when a subjective perception of a vehicle occupant is material to the vehicle property to be evaluated in the context of overall vehicle behavior, very good correlations can in this way be made between test person assessments and the inventive method.

In contrast, if criteria which do not depend on the subjective perception of a vehicle occupant are evaluated according to the inventive method and system, the conversion of the simulated variable as a function of the driving state parameter into a preferably objective evaluation parameter is relatively simple. This is for example the case with the criteria of emission and efficiency.

Conversely, for criteria depending on the subjective perception of a vehicle occupant, such as e.g. driving capability, sense of safety, driving comfort or agility, it is preferably necessary to establish a relationship between the simulated variables, the driving modes and the respective passenger perceptions. Preferably, a training phase for the second module of the system is thereby provided which is at least substantially similar to the system training described in the EP 0 846 945 B1 referenced above.

In a first working step of the system training, a vehicle occupant, in particular a test driver, undertakes a test operation in the actual vehicle without needing to abide by any predefined driving cycle. Preferably, the driving cycle performed in the test corresponds substantially to a normal driving operation. Drive-related and vehicle-related data are thereby preferably logged during the driving operation as time series. Drive-related data is in particular engine speed, engine torque, power demand, in the case of an internal combustion engine, particularly accelerator pedal and/or throttle valve position, negative intake manifold pressure, coolant temperature, ignition point, injection rate, lambda value, exhaust gas recirculation rate and exhaust temperature. Vehicle-related data is in particular vehicle speed, longitudinal vehicle acceleration, lateral vehicle acceleration, coasting, rolling and pitching.

In a second working step, different driving modes become known on the basis of previously defined conditions, in particular by a driving mode parameter being output.

For example, "tip-in" can be used to define a driving state as a driving mode in which a sudden opening of the throttle valve occurs in an initial state of low speed and low load. Conditions are defined for each driving mode to be differentiated, in this case for the measured variables, wherein their occurrence is inferred from the presence of the respective driving mode defined by the conditions.

The conditions are thereby identical to the conditions which later define the driving mode parameters or driving modes respectively in the inventive method.

In analyzing the measured data logged from a series of measurements, the measured variables can therefore be associated with individual points in time of an existing driving mode. For example, it can in this way be determined at which points in time of the test drive a tip-in was present in the driving mode. An evaluation parameter is preferably defined for each of these time points on the basis of one or more measured variables.

In order to establish the correlation between the evaluation parameter and the subjective perception of an occupant of the motor vehicle during system training, the test subjects are preferably surveyed about the overall vehicle behavior of the vehicle. The evaluation parameter is then preferably specified/correlated in such a way as to most closely reflect the evaluation by the test subject(s) as possible. In doing so, statements made by multiple test subjects on the overall performance of the motor vehicle are preferably evaluated by statistical means.

An assignment rule obtained in this way can preferably be used in determining the evaluation parameter.

In a further advantageous configuration, the inventive method comprises the further following working steps:

adapting the values of at least one simulated variable for the respective driving mode parameter or the at least one evaluation parameter value to a prespecified setpoint range, in particular to target values for a configuration of the motor vehicle; and modifying at least one function parameter of the function of the at least one partial model used for the simulation on the basis of the adaptation should the values of the at least one simulated variable or the value of the at least one evaluation parameter lie outside of the setpoint range, whereby the method preferably repeats the working step of simulating the driving operation; or outputting a value of the at least one function parameter of the function of the at least one partial model used for the simulation should the values of the at least one simulated variable or the value of the at least one evaluation parameter lie within the setpoint range.

Correspondingly, the system according to the invention comprises in one advantageous configuration:

means configured to adapt the values of at least one simulated variable for the respective driving mode parameter or the value of the at least one evaluation parameter to a prespecified setpoint range, in particular to target values for a configuration of the motor vehicle;

means configured to modify at least one function parameter of the function of the at least one partial model used for the simulation on the basis of the adaptation should the values of the at least one simulated variable or the value of the at least one evaluation parameter lie outside of the setpoint range, whereby the method preferably repeats the working step of simulating the driving operation; and means for outputting a value of the at least one function parameter of the function of the at least one partial model used for the simulation should the values of the at least one simulated variable or the value of the at least one evaluation parameter lie within the setpoint range.

This advantageous configuration of the inventive method enables optimizing, in particular in automated fashion, the function used for the simulating, or the partial model of the component of the motor vehicle respectively, in terms of the criteria relevant to the overall vehicle behavior. To that end, the values of the simulated variables are compared to a setpoint range set for example on the basis of a reference vehicle in consideration of the respectively given value of the driving mode parameter.

Alternatively or additionally, an evaluation parameter, which already contains an objectified evaluation based for example on a plurality of reference vehicles, can be compared to a setpoint range for said evaluation parameter. The respective setpoint range thereby reflects target values for the configuring of the at least one component of the motor vehicle.

If the simulated results do not yet reach the desired target values, the function used for the simulating or the partial model of the component of the motor vehicle respectively is modified, in particular by a modifying of the function parameters or respectively the coefficients of the function of the at least one partial model used for the simulating. Optimization algorithms as are known in the prior art are in particular used to this end.

Preferably, at least one simulated variable subject to the driving mode parameter and/or the values of the evaluation parameter and the function parameters/coefficients of the function used for the simulation are input into such an optimization algorithm as variables. The dependence of the variables is then represented by polynomial models and if need be expanded by different types of neural network algorithms, in particular in order to account for correlations between individual polynomial models. Preferably these model algorithms not only indicate local models but global models. The global model algorithms then specify the behavior of the component to be configured over the entire operating range as a function of the function parameters of the simulated function. Preferably, a (further) experimental design is created on the basis of these global model algorithms which indicates variation points in relation to the function parameters of the function or functions used in the simulating.

The working step of simulating the driving operation will then be repeated again based on this experimental design and the method can continue in this way iteratively.

Preferably, other or further boundary conditions than the criterion of overall vehicle behavior can enter into the model algorithm used for optimization, for instance legal safety regulations, e.g. minimum distances in traffic or even legal emission regulations.

If the values of the simulated variables subject to the driving mode parameter or the value of the evaluation parameter lie within the target value corridor, the function of the partial model of the vehicle component used for simulating is then output, in particular, an indication is given here that the overall vehicle behavior of the motor vehicle meets the specified target values with the function used for the simulation.

From that, the motor vehicle component to be represented by the function-based partial model can be configured or designed such that the operation of the component reflects the function used for the simulation.

The inventive simulation-based methodology allows predicting targeted configuration-relevant overall vehicle characteristics with sufficient accuracy very early on in the concept and design stage of a new motor vehicle in which no vehicle test bed is yet available for testing. Additionally, a technical hardware specification can be generated for configuration-relevant motor vehicle and engine components by using an optimization algorithm, in particular in conjunction with a design objective metric; i.e. an evaluation parameter. The inventive simulation-based methodology can thereby in particular be realized by function-based models at least partly replacing characteristic map-based models as normally used for the simulation of a motor vehicle or its components respectively. For example, for an internal combustion engine, the current engine torque on the crankshaft, which is normally indicated in each simulation time step in a map-based model as a function of load and/or acceleration pedal position and engine speed, is inventively represented by a corresponding function-based model.

Such a function-based or respectively parametric torque model according to the invention can illustrate the stationary and transient torque characteristics of an internal combustion engine, particularly a supercharged internal combustion engine, by way of mathematical functions with few function parameters. This in particular also allows the sufficiently accurate simulating of transient driving modes of the motor vehicle such as full-load acceleration, low-end torque, tip-in (positive load change), tip-out (negative load change), acceleration, etc.

In a further advantageous configuration of the inventive method, the modification is based on an optimization algorithm and the at least one function parameter of the function used in the simulation is treated in the optimization algorithm as a manipulated variable, particularly sole manipulated variable(s), of the component or motor vehicle.

In a further advantageous configuration, the inventive method further comprises the following working step:
  generating a further experimental design which comprises variation points in regard to the at least one function parameter of the function used for the simulation, in particular on the basis of an optimization algorithm, whereby the simulation working step ensues on the basis of the further experimental design.

Correspondingly, the system according to the invention comprises in one advantageous configuration:
  means configured to generate a further experimental design which comprises variation points in regard to the at least one function parameter of the function used for the simulation, in particular on the basis of an optimization algorithm, whereby the simulation working step ensues on the basis of the further experimental design.

In a further advantageous configuration, the inventive method further comprises the following working step:
  defining a second technical specification for the at least one component and/or the motor vehicle on the basis of the function used for the simulation or respectively the value of its at least one function parameter.

In a further advantageous configuration, the inventive method further comprises the following working step:
  modifying a design and/or a control or regulation of the component and/or the motor vehicle on the basis of the function used for the simulation or respectively the value of its at least one function parameter.

Further embodiments of the inventive method relate in particular to an embodiment in which the component is a drive apparatus, in particular an internal combustion engine. Accordingly, the inventive method further exhibits the following advantageous configurations:

In one further advantageous configuration of the inventive method, the partial model is a torque model of the drive apparatus, in particular an internal combustion engine, of the motor vehicle, wherein the partial model comprises at least one of the following sub-models:
  full load model based on a full-load function;
  partial load model based on a partial-load function;
  torque gradient model based on a torque gradient function; and
  suction torque model based on a suction torque function.

In order to fully illustrate the operation of a drive apparatus, it is necessary to illustrate the stationary and transient torque characteristic. This is achieved by the full load model and the partial load model. Furthermore needing to be illustrated is the transient torque build-up, for example after a sudden change of load or accelerator pedal position, which is achieved by the torque gradient model.

In a further advantageous configuration of the inventive method, the torque model comprises at least the full load model, and the full-load function depicts a full-load characteristic by means of three subfunctions:
  full-load function at low engine speed;
  full-load function at medium engine speed; and
  full-load function at maximum power.

The full-load characteristic, in particular the full-load characteristic of an internal combustion engine, is not entirely differentiable but exhibits breaks so that it can preferably be fully depicted by being divided into three different function ranges. This is inventively achieved by the ranges of low engine speed, medium engine speed and maximum power, whereby at low engine speed and medium engine speed, the full-load function is approximated by the torque while preferably at maximum power, the function is approximated by the curve to the power. The functions for each subrange can preferably be defined by only two function parameters.

In a further advantageous configuration of the inventive method, the partial-load function is calculated on the basis of the full-load function and a pedal characteristic function which indicates a correlation between the torque variable and the "pedal or throttle valve position" variable. This function can also be defined by only two function parameters.

In a further advantageous configuration of the inventive method, the pedal characteristic function comprises a first function parameter and a second function parameter, both of which are speed-dependent and whereby the first function parameter indicates one factor and the second function parameter an offset. Thereby results in a particularly simple structure to the pedal characteristic function, which simplifies use in an optimization algorithm.

In a further advantageous configuration of the inventive method, the torque gradient function exhibits a linear and a cubic portion, whereby a function parameter indicates the direction of the linear and cubic portion. Thus, the torque gradient function can also be likewise specified with only three function parameters.

It should be noted here that a low number of function parameters also means a low number of variables in a polynomial model of an optimization algorithm to be modified. Thus, the modeling can keep the number of experimental design variation points as low as possible.

In a further advantageous configuration of the inventive method, the at least one partial model in each case indicates the stationary and/or transient operation of the at least one component.

In a further advantageous configuration of the inventive method, the at least one component is an internal combustion engine, a charging system, a steering system, a power train, a chassis system, a transmission system or a driver assistance system.

In one advantageous configuration, one or more, in particular all of the steps of the method are fully or partially automated, particularly by the system or its means respectively.

Further advantageous configurations, in particular with respect to the third and fourth aspect of the invention, are indicated in the following:

In a further advantageous configuration, the method further comprises the following working step:
  determining a driving mode parameter defined in relation to one or more values of at least one simulated variable and/or at least one manipulated variable and suitable in characterizing at least one driving mode, in particular a driving state; wherein the values of the at least one simulated variable are output in conjunction with the respectively associated driving mode parameter.

In a further advantageous configuration of the method, the partial model, which is based on a function, comprises at least one function parameter, the modifying of which enables the simulated driving operation of the motor vehicle to be able to be modified.

In a further advantageous configuration of the method, the driving mode parameter is defined by at least one predetermined condition in relation to at least one manipulated variable and/or at least one simulated variable.

In a further advantageous configuration of the method, the simulating working step ensues for points of variation of an experimental design, in particular a statistical experimental design.

In a further advantageous configuration, the method further comprises the following working steps:
  determining a value of at least one evaluation parameter which indicates the overall vehicle behavior of the motor vehicle on the basis of an assignment rule, in particular a function, subject to the at least one output simulated variable and/or driving mode parameter; and
  outputting the value of the at least one evaluation parameter.

In a further advantageous configuration, the method further comprises the following working step:
  preparing a first technical specification with respect to the driving operation of the motor vehicle which corresponds at least to one setpoint range of at least one simulated variable, in particular for the respective driving mode parameter or the value of the at least one evaluation parameter corresponding to design criteria target values for the motor vehicle, preferably overall vehicle behavior and more preferably, driving capability.

In a further advantageous configuration, the method further comprises the following working step:
  optimizing the partial model, which is based on a function, in relation to a setpoint range of at least one simulated variable, in particular for the respective driving mode parameter or the at least one evaluation parameter corresponding to design criteria target values for the motor vehicle, preferably overall vehicle behavior and more preferably, driving capability.

In a further advantageous configuration, the method further comprises the following working steps:
  adapting the values of at least one simulated variable for the respective driving mode parameter or the at least one evaluation parameter value to a prespecified setpoint range, in particular to target values for a configuration of the motor vehicle; and
  modifying at least one function parameter of the function of the at least one partial model used for the simulation on the basis of the adaptation should the values of the at least one simulated variable or the value of the at least one evaluation parameter lie outside of the setpoint range, whereby the method preferably repeats the working step of simulating the driving operation; or
  outputting a value of the at least one function parameter of the function of the at least one partial model used for the simulation should the values of the at least one simulated variable or the value of the at least one evaluation parameter lie within the setpoint range.

In a further advantageous configuration of the method, the modification ensues on the basis of an optimization algorithm and the at least one function parameter of the function used for the simulation is treated in the optimization algorithm as a manipulated variable, particularly sole manipulated variable(s), of the component or motor vehicle.

In a further advantageous configuration, the method further comprises the following working step:

generating a further experimental design which comprises variation points in regard to the at least one function parameter of the function used for the simulation, in particular on the basis of an optimization algorithm, whereby the simulation working step ensues on the basis of the further experimental design.

In a further advantageous configuration, the method further comprises the following working step:
defining a second technical specification for the at least one component and/or the motor vehicle on the basis of the function used for the simulation or respectively the value of its at least one function parameter.

In a further advantageous configuration of the method, the at least one partial model characterizes an apparatus of the vehicle further comprising the following working step:
designing or modifying a design and/or a control or regulation of the component and/or the motor vehicle on the basis of the function used for the simulation or respectively the value of its at least one function parameter.

In a further advantageous configuration of the method, the at least one partial model is a torque model of a drive apparatus, in particular an internal combustion engine of the motor vehicle, and the partial model comprises at least one of the following sub-models:
full load model based on a full-load function;
torque gradient model based on a torque gradient function;
partial load model based on a partial-load function;
suction torque model based on a suction torque function.

In a further advantageous configuration of the method, the torque model comprises at least the full load model and the full-load function specifies a full-load characteristic by means of three subfunctions:
full-load function at low engine speed;
full-load function at medium engine speed;
full-load function at maximum power.

In a further advantageous configuration of the method, the partial-load function is calculated on the basis of the full-load function and a pedal characteristic function which indicates a correlation between a "torque" variable and a "pedal or throttle valve position" variable.

In a further advantageous configuration of the method, the pedal characteristic function comprises a first function parameter and a second function parameter, both of which are speed-dependent and whereby the first function parameter indicates one factor and the second function parameter an offset.

In a further advantageous configuration of the method, the torque gradient function exhibits a linear and a cubic portion, whereby a function parameter indicates the weighting of the linear and cubic portion.

In a further advantageous configuration of the method, the driving mode parameter and/or the evaluation parameter is determined as a function of a vehicle parameter, preferably mass and/or engine characteristic of the motor vehicle, in particular maximum power, maximum torque and/or maximum engine speed.

In a further advantageous configuration of the method, the model comprises a vehicle model as a further partial model configured to at least partly characterize a driving characteristic of the motor vehicle.

In a further advantageous configuration, the method further comprises the following working step:
providing vehicle parameters with respect to the motor vehicle, on the basis of which the driving operation of the motor vehicle is simulated, in particular by means of a vehicle model;

In a further advantageous configuration of the system, the second module further comprises:
means configured to determine a driving mode parameter defined in relation to one or more values of at least one simulated variable and/or at least one manipulated variable and suited to characterizing at least one driving mode, in particular a driving state of the motor vehicle, whereby the values of the at least one simulated variable are output in conjunction with the respectively associated driving mode parameter.

In a further advantageous configuration of the system, the partial model, which is based on a function, comprises at least one function parameter, the modifying of which allows the simulated driving operation of the motor vehicle to be modifiable.

In a further advantageous configuration of the system, the first data interface is configured to furnish vehicle parameters, values of the at least one manipulated variable and/or the at least one simulated variable from the first module to the second module and values of a function parameter and points of variation from the second module to the first module.

In a further advantageous configuration of the system, the second module further comprises:
means configured to determine at least one evaluation parameter which indicates the overall vehicle behavior of the motor vehicle based on an assignment rule, in particular a function dependent on the at least one output simulated variable and/or driving mode parameter, and wherein the output means is further configured to output the at least one evaluation parameter.

In a further advantageous configuration of the system, the second module further comprises:
means for preparing a first technical specification with respect to the driving operation of the motor vehicle which corresponds at least to one setpoint range of at least one simulated variable, in particular for the respective driving mode parameter or the value of the at least one evaluation parameter corresponding to design criteria target values for the motor vehicle, preferably overall vehicle behavior and more preferably, driving capability.

In a further advantageous configuration of the system, the second module further comprises:
means for optimizing the partial model, which is based on a function, in relation to a setpoint range of at least one simulated variable, in particular for the respective driving mode parameter, or the value of the at least one evaluation parameter corresponding to design criteria target values for the motor vehicle, preferably overall vehicle behavior and more preferably, driving capability.

In a further advantageous configuration of the system, the second module further comprises:
means configured to adapt the values of the at least one simulated variable output for the respective driving mode parameter to a prespecified setpoint range, in particular to design criteria target values for the motor vehicle;
means configured to modify at least one function parameter of the function of the at least one partial model used for the simulation on the basis of the adaptation should the values of the at least one output simulated variable lie outside of the setpoint range, whereby the working step of simulating the driving operation is preferably repeated; and means for outputting a value of the at least one function parameter should the values of the at least one output simulated variable lie within the setpoint range.

In a further advantageous configuration, the system furthermore comprises a third module, wherein the third module is connected to the second module via a second data interface and to the first module via a third data interface and comprises:

means configured to adapt the at least one evaluation parameter to a predefined setpoint range, in particular to design criteria target values for the motor vehicle;

means configured to modify at least one function parameter of the function of the at least one partial model used for the simulation on the basis of the adaptation should the at least one evaluation parameter lie outside of the setpoint range, whereby the working step of simulating the driving operation is preferably repeated; and means for outputting a value of the at least one function parameter should the at least one evaluation parameter lie within the setpoint range.

In a further advantageous configuration of the system, the second data interface is configured to furnish values of the evaluation parameter from the second module to the third module and the third data interface is configured to furnish values of the function parameter and points of variation from the third module to the first.

In a further advantageous configuration of the system, the second module or the third module further comprises:

means for generating an experimental design which comprises points of variation in regard to the at least one function parameter of the function used for the simulation, in particular on the basis of an optimization algorithm, whereby the simulation working step ensues on the basis of the further experimental design.

Further features and advantages of the invention will be evident from the following description of the exemplary embodiments, particularly in conjunction with the figures.

Figure 2:
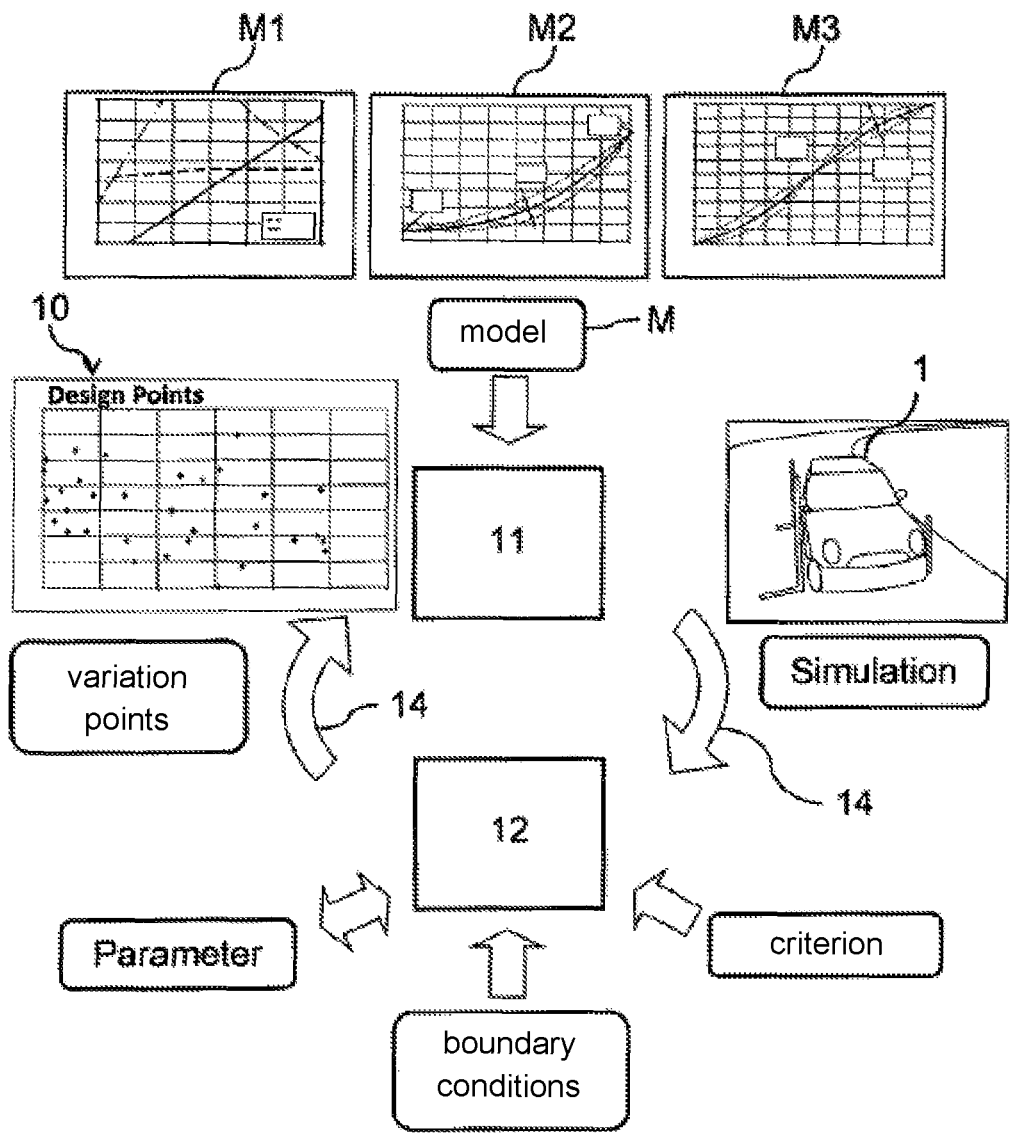
Figure 7:
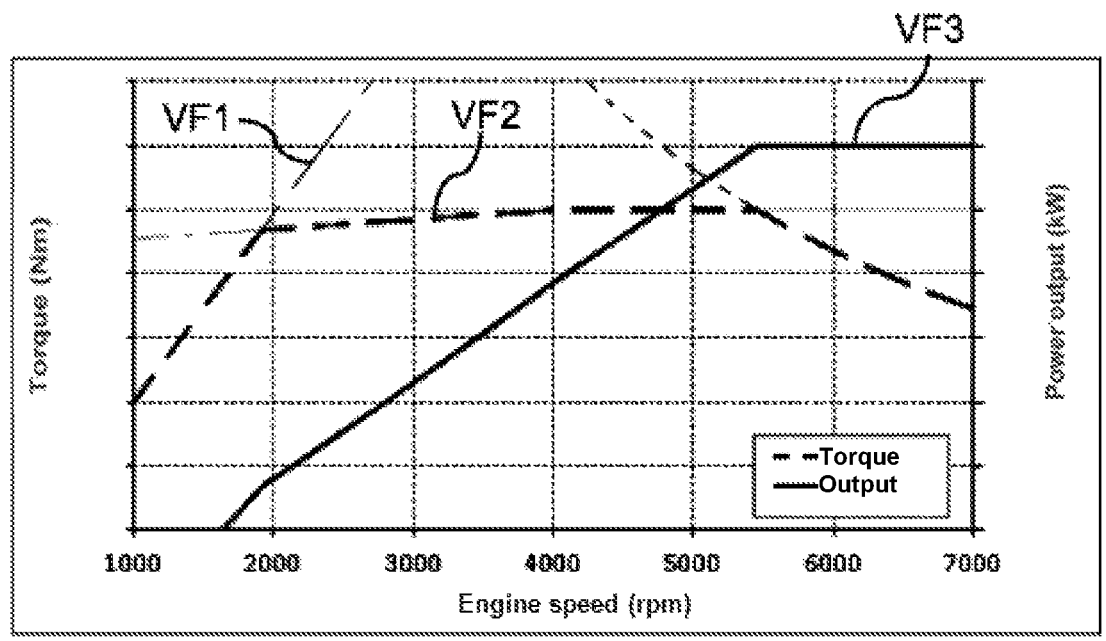
Figure 8:
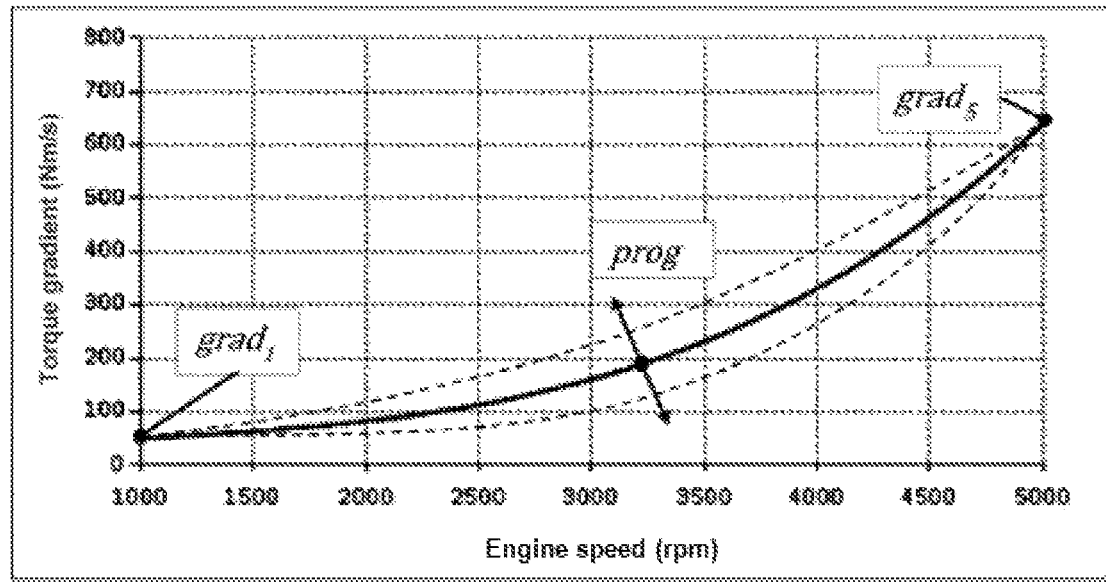
Figure 9:
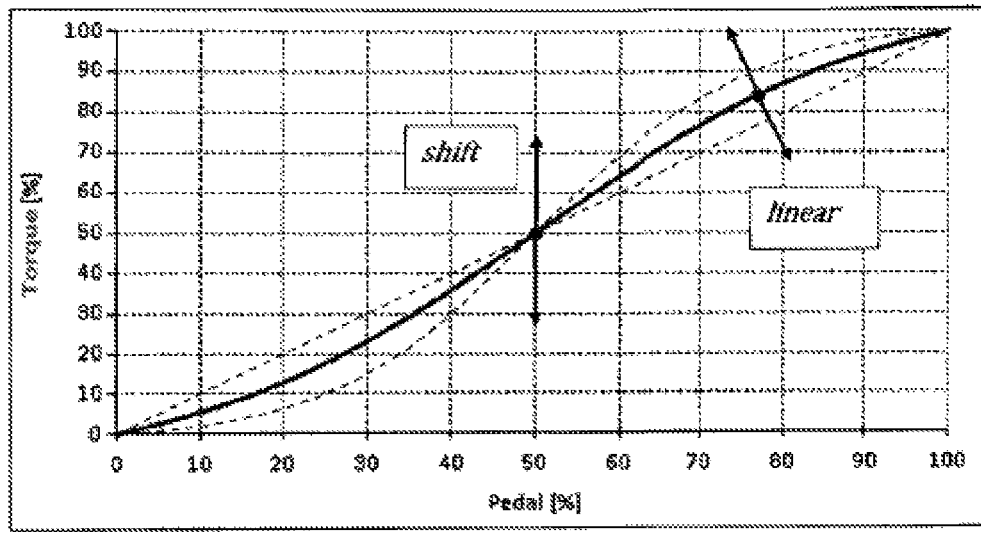
Figure 10:
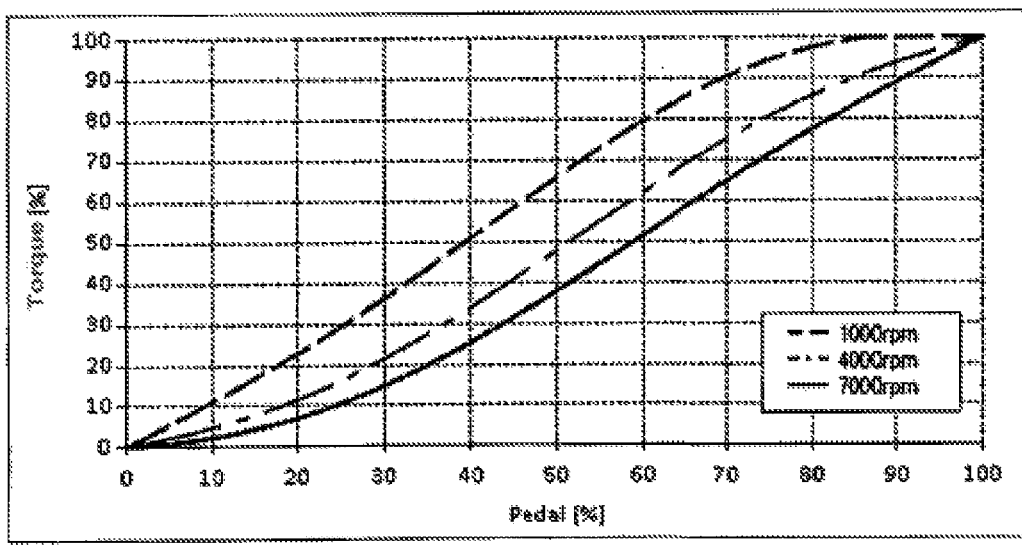
Figure 11:
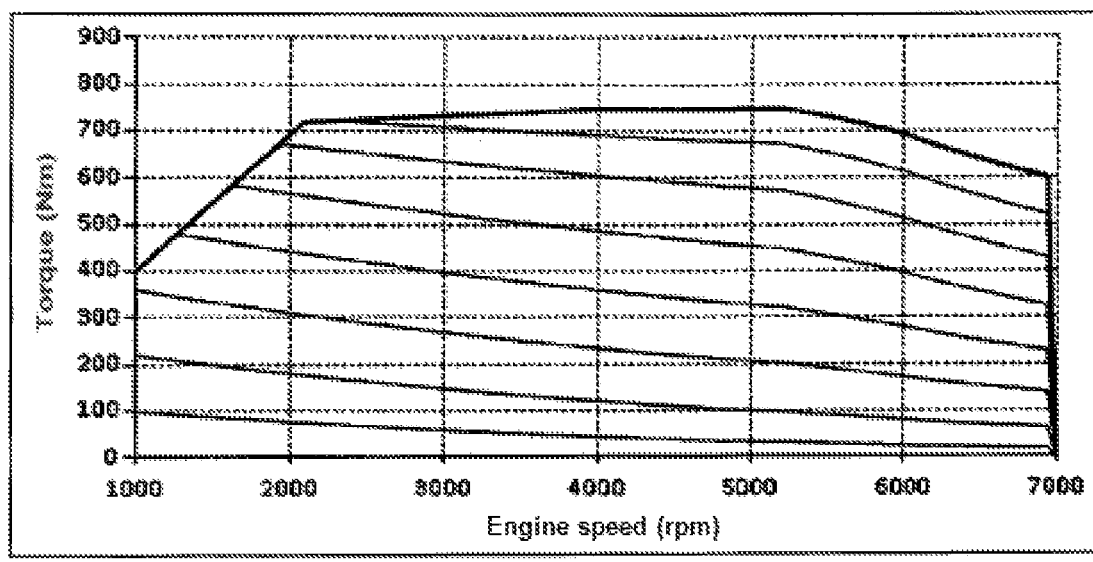
Figure 12:
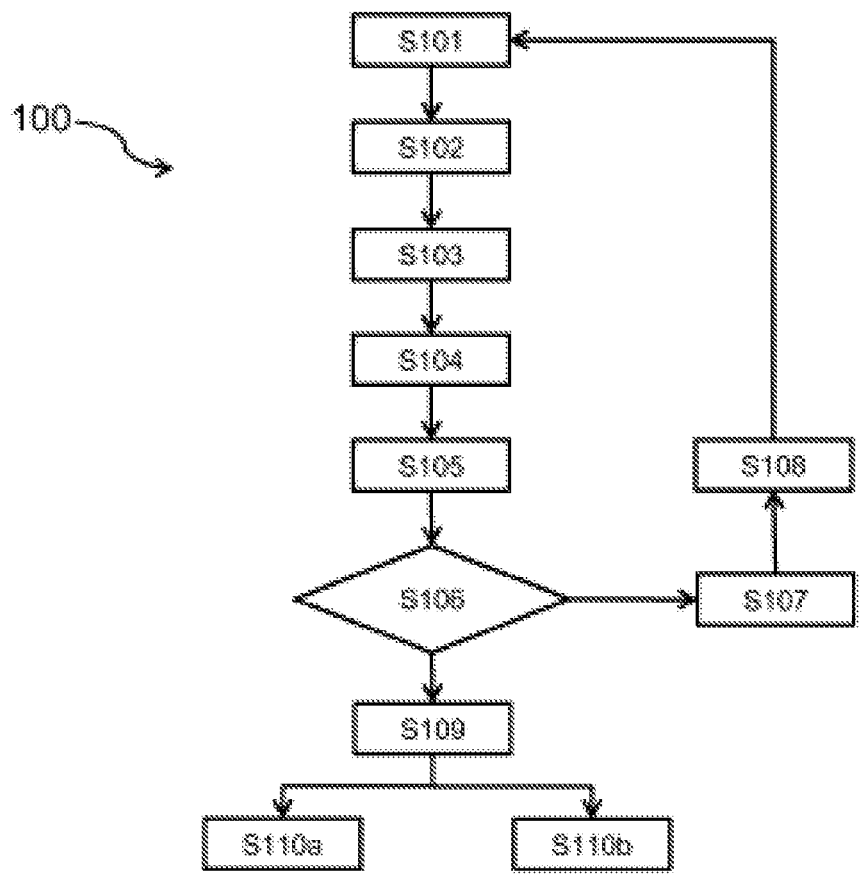

Shown at least partly schematically therein are:

FIG. 1 a first exemplary embodiment of the inventive system;

FIG. 2 a second exemplary embodiment of the inventive system;

FIGS. 3 to 6 an inventive subdividing of a full-load characteristic of an internal combustion engine into three ranges;

FIG. 7 a full-load characteristic with applied approximation function;

FIG. 8 a torque gradient approximation function;

FIGS. 9 and 10 a pedal characteristic approximation function of a partial load model;

FIG. 11 a full-load characteristic with applied partial-load approximation function; and FIG. 12 a flow chart of an exemplary embodiment of the method according to the invention.

The following will describe a first exemplary embodiment of the inventive system 10 for the simulation-based analysis and/or optimization of a motor vehicle and an associated inventive method 100 on the basis of FIGS. 1 and 12.

The system 10 according to the invention thereby preferably comprises three modules 11, 12, 13, each connected by data interfaces for data transmission. In particular, as indicated by the arrow in FIG. 1, data is transferred from the first module 11 to the second module 12 via a first data interface 14, from the second module 12 to the third module 13 via a second data interface 15, and in turn from the third module 13 to the first module 11 via a third data interface 16.

A model M with which the driving operation of a motor vehicle 1 can be simulated is stored in the first module 11. As indicated by the arrow, this model M can be read in or written into the module 11 from outside via an interface. Preferably, however, the model M can also be read out again from the module 11.

In order to implement a working step of simulation S101 for the first time, a predetermined driving cycle is preferably stored in the first module 11 which represents a sequence of driving modes for the motor vehicle 1. This driving cycle is preferably developed on the basis of experiences made by test engineers and comprises load points for the calibration of a motor vehicle 1, in the present example embodiment, the drive or respectively internal combustion engine of the motor vehicle 1, that experience has shown to be necessary.

The model M makes use of a partial model to simulate the operation of the internal combustion engine 1. This partial model is function-based; i.e. it is specified by a function which comprises function parameters, in particular coefficients, and variables, in particular manipulated variables such as e.g. the engine speed and accelerator pedal position. The function thereby reflects an assignment rule which continuously assigns a value of one or more simulated variables to a set of manipulated variable values.

Preferably, further partial models of the model M specify the function of further components of the vehicle. If these further components are not likewise to be analyzed or optimized by the inventive method 100, then the further partial models can preferably be map-based; i.e. the assignment rule inherent to these partial models is not stored as a function but as a characteristic map which discretely assigns a value of one or more simulated variables to a set of manipulated variable values in each simulation time step.

In particular, the model M can comprise a vehicle model as the further partial model which is configured to simulate a driving characteristic of the motor vehicle 1. The vehicle parameters which enter into such a vehicle model are in particular the weight and/or the size or respectively the center of mass of the vehicle.

A vehicle model is prepared in a known manner in order to be able to simulate a driving operation. The first module 12 thereby preferably simulates a two-mass or multi-mass oscillator in order to reflect the mass of the motor vehicle 1, the rigidity of the power train and the response characteristic of the tires. Further preferably, the damping can also be simulated on the basis of the vehicle model. The damping values depend in particular on the operating state of the vehicle.

Moreover, such a vehicle model can comprise further sub-models such as, for example, a tire model, a wheel suspension model (spring/damper), a geometrical chassis suspension model, a traction resistance model, a steering model, a clutch model, a transmission model and/or an elasticity model (multi-mass system/multi-mass oscillator).

The working step of simulation S101 creates simulated variable values of the model M by executing the predetermined driving cycle on the vehicle 1 characterized by the model M. The initial values of the function parameters or respectively coefficients of the function used for the simulation are thereby preferably selected on the basis of test engineer experiences. Further preferably, these can also, as stated further below with respect to later iterations, be initially prespecified by the third module 13, preferably in the form of points of variation of an experimental design.

This type of simulation of the driving operation of the motor vehicle 1 can in particular be realized with the applicant's AVL VSM™ system.

At least one of the simulated variables is thereby suitable, in particular in conjunction with other simulated variables, for characterizing an overall vehicle behavior of the vehicle 1, respectively assessing the overall vehicle behavior based on said variable. In particular, the overall vehicle behavior encompasses at least the driving capability. In this case, the overall vehicle behavior, in particular the driving capability, serves as a criterion for the design of the vehicle 1.

The simulated variables are preferably passed on to the second module 12. The second module 12 is thereby preferably capable of checking the values of the simulated variables S102 for the presence of a given condition. Such a condition is in particular a set of the values of multiple simulated variables and/or the sequence of values of one or more variables. If such a condition is fulfilled, the second module 12 then determines a driving mode and establishes a driving mode parameter thereto.

Alternatively, the driving mode parameter is defined on one or more values of at least one simulated variable or at least one manipulated variable, although does not however represent a separate value but is instead substantially an allocation of values of at least one simulated variable characterizing the overall vehicle behavior of the vehicle to the values of at least one simulated variable and/or at least one manipulated variable characterizing the driving mode.

Additionally to simulated variables, manipulated variables of the model M can also be used to define the driving mode parameter. An example of this is the accelerator pedal and/or throttle valve position, from the value of which a driving mode can be concluded.

The driving mode parameter is thereby preferably a numeric value or a set of numeric values or also defined by a term which is assigned to the value or values.

To determine the driving mode parameter, a database can in particular be provided in the second module 12, on the basis of which the current driving mode can be determined based on the driving mode parameter by adapting values of the simulated and/or manipulated variables.

Data is thereby preferably exchanged between the first module 11 and the second module 12 via the first interface 14, which can be in the form of software and/or hardware.

In the present exemplary embodiments, the values of the at least one simulated variable which characterize the overall vehicle behavior in conjunction with the respectively given driving mode parameter are output. Preferably, the values are thereby directly output to a third module 13 which in particular serves in the applying of an optimization algorithm on the results determined in the simulation.

Further preferably, the values are output to an evaluation algorithm in the second module 12, with which the simulated variables determined for the motor vehicle 1 which express the overall vehicle behavior can be evaluated, preferably objectified. To that end, in particular utilized is an assignment rule between at least one simulated variable, by means of which the overall vehicle behavior can be characterized, and the driving mode parameter to the evaluation parameter into which enters the evaluation of one or more motor vehicles by human test drivers, particularly as regards reference vehicles. Establishing such an assignment rule by which to sort an evaluation parameter as a function of a simulated variable, by means of which the overall vehicle behavior can be characterized, will be clarified below by means of an exemplary embodiment relative to the driving mode. This relates to a tip-in in second gear, thus an acceleration process with increasing throttle opening.

One exemplary embodiment of establishing an assignment rule for the assigning of an evaluation parameter to a respective driving mode parameter or driving mode respectively will be clarified below on the basis of the driving mode of a so-called tip-in in second gear, thus an acceleration process with increasing throttle opening.

In an actual driving operation with a test subject as vehicle occupant, the throttle valve position, the engine speed and the longitudinal acceleration is first measured as a function of time for a tip-in driving mode. Parallel thereto, the subjective perceptions of the test subject are recorded, for example by the test subject inputting their subjective perception as an assessment via a user interface. Preferably a ten-part scale from outstanding=10 to extremely poor=1 can serve as the assessment criteria.

In real time or after recording a dataset, the engine speed n and the longitudinal acceleration is evaluated. Preferably, a Fast Fourier Transformation (FFT) of the engine speed n and the longitudinal acceleration is thereby computed. Moreover, a maximum value of bucking oscillations in the frequency range between 2 and 8 hertz as well as the frequency at which the maximum value occurs is preferably computed according to the following equation:

$$a(s) = \int_{-\infty}^{\infty} e^{-ist} a(t) dt$$

st thereby represents the imaginary part and a(t) the chronological course of the acceleration.

From that, a correlation is made according to the following equation between the test subject's subjective perception, the FFT and the maximum bucking oscillation values:

$$Dr = \frac{c1}{\sqrt{c2 * a_{osc}^{c3}}}$$

c1, c2 and c3 are thereby parameters, $a_{osc}$ the maximum value of the bucking oscillation in the 2 to 8 hertz range, and Dr the calculated evaluation parameters, in the present case a so-called driving capability index for the driving capability criterion. The c1, c2 and c3 parameters can preferably be found automatically in a self-learning system. Preferably, iteration loops are used to that end in which the parameters are modified until there is minimum subjective deviation between the legitimate value Dr and the subjective perception of the test subject Dr. This occurs pursuant to the following equations:

$$c1_{i+1} = c1_i + p_i,$$

$$c2_{i+1} = c2_i + q_i,$$

$$c3_{i+1} = c3_i + r_i,$$

Here, the $p_i$, $q_i$, and $r_i$ expressions represent variation increments. The c1, c2 and c3 variation ensues until the difference between the calculated evaluation parameter Dr and the subjective evaluation parameter $Dr_{subj}$ is less than a predefined limit.

After complete system training, the subjective evaluation in the vehicle can be fully simulated from the amplitudes $a_{osc}$ of the bucking oscillation. The identified parameters c1, c2, c3 reflect the subjective assessment.

The depicted exemplary embodiment for establishing the assignment rule for the evaluation parameter is only one of numerous possibilities for creating the assignment rule. The iteration can thus also be realized with other known mathematical or statistical methods.

Alternatively, the assignment rule can also be a comparison of a simulated variable to a setpoint range. The setpoint range in this case corresponds to target values for a criterion. For example, a certain fuel consumption over a setpoint range could thereby be given as the target value. The fuel consumption, which is simulated by means of model M, can then be compared to the setpoint range and it thus be determined whether there is an excess or even a shortfall and a change is necessary to the model M or the function parameters contained therein.

In this case, the optimization algorithm is preferably provided in the second module 12 which then creates a new experimental design or set of new variation points of the function parameter respectively to the setpoint range as target value directly on the basis of the simulated variable, the simulated consumption in the present case. The evaluation parameter is in this case the consumption. The simulation is then run again S101 in the first module 11 with the new function parameters.

Alternatively, such a relationship of simulated fuel consumption as simulated variable and the associated setpoint range as target values could also be transformed into an assessment expressed by a numerical value, in particular a grade or a phrase ("too low," "too high," "ok"). This evaluation parameter, which is preferably computed by the second module 12, is then preferably output to the third module 13 via the second interface 15. The optimization algorithm stored in this case in the third module 13 then computes function parameter variation points for optimizing consumption, in particular on the basis of an experimental design.

In order to be able to determine the evaluation parameter on the basis of the assignment rule, it is preferably further provided for the second module 12 to provide vehicle parameters with regard to the motor vehicle 1 simulated by the first module 11. These are preferably the mass and the engine characteristic, in particular maximum power, maximum torque, engine speed at maximum power, engine speed at maximum torque and maximum engine speed of the simulated motor vehicle 1. Further preferably, this data is transmitted from the first module 11 to the second module 12 via the first data interface 14.

As shown in the lower diagram in FIG. 1, the evaluation parameter can not only contain a single assessment but can also consist of a plurality of assessments. In FIG. 1, an overall assessment for acceleration at full load consists for example of a maximum expected momentum, a 90% torque threshold, a 90% torque range, a broad torque level, a vehicle turning response, an expected acceleration and a reference acceleration. The second module 12 can thereby be given a plurality of criteria on the basis of which the assessment or respectively the determining of the evaluation parameter S104 for the overall vehicle behavior of the motor vehicle 1 is to be made. Examples of such criteria include e.g. driving capability, agility, driving comfort, emissions, efficiency, NVH behavior, vehicle turning response, sense of safety and function of the driver assistance systems. A particularly accurate assessment of the overall vehicle behavior can thereby be achieved when these criteria are evaluated in a holistic context.

A value of the evaluation parameter determined by means of the assignment rule is then output S105 from the second module 12 to the third module 13 via a second data interface 15 as an alternative to at least one simulated variable in conjunction with the driving mode parameter. Alternatively or additionally, the evaluation parameter can also be output via a user interface.

An optimization algorithm for improving the assessment of the overall vehicle behavior is then preferably run In the third module 13. Function parameters or respectively coefficients of the function of the at least one partial model of model M are thereby input into this evaluation algorithm as variables. These variables are varied on the basis of the optimization algorithm in order to achieve an optimization S107 of the evaluation parameter or the one or more valuation criteria respectively. The criteria of the evaluation can thereby preferably be weighted differently.

Further boundary conditions further preferably enter into the optimization algorithm. This can for example be properties which were not taken into account during the evaluation in the second module 12. Such boundary conditions can for example be a desired torque or a desired performance or even boundary conditions which while not characterizing the overall vehicle behavior of the motor vehicle 1 are nonetheless for example relevant to safety or prescribed by law.

Preferably, prior to modifying the function parameters of the function of the at least one partial model used for simulation, it is determined whether the overall vehicle behavior is already achieving a desired evaluation S106. To this end, particularly values of the at least one simulated variable, by which the overall vehicle behavior can be characterized, are compared to a setpoint range for the respective associated driving mode parameters, in particular with target values for a configuration of the motor vehicle 1. Alternatively or additionally, the evaluation parameters determined by the second module 12 can also be compared to a setpoint range.

The evaluation algorithm is in this case only implemented if a setpoint range has not yet been reached. If, in contrast, the setpoint range has been reached, the last value used of the at least one function parameter of the function of the partial model used for simulation is output S109 as is described in the following.

In particular, the function parameters of the partial model functions used for simulation in the optimization algorithm are treated as manipulated variables, in particular as sole manipulated variables, of the component of the motor vehicle 1 or the function of the partial model of said component respectively.

The function parameters are thereby provided to the third module 13 from the first module 11 via the third data interface 16 or in particular defined as a variable by a user when setting up the optimization algorithm prior to executing the inventive method 100.

If the setpoint range of the evaluation has not yet been reached, the third module 13 then preferably provides an experimental design based on the optimization algorithm S108 which comprises further points of variation in a variation range spanned by the at least one function parameter of the function of the partial model used for the simulating. The driving operation of the motor vehicle 1 is then re-run on the basis of the modified partial model in the manner of an iterative optimization; i.e. with modified function parameters or coefficients, S101'.

Such an experimental design is in particular established on the basis of statistical methods and corresponds to a statistical experimental design (design of experiment). The variation points of such an experimental design are for example the "design points" depicted in FIG. 1.

If, on the other hand, it is determined during the comparison with respect to the assessment S106 that the assessment already corresponds to a desired setpoint range in terms of overall vehicle behavior, then the value of the at least one function parameter or respectively coefficient of the function of the partial model is output S109.

Preferably, the value or values can be output by means of a user interface; further preferably, the value or values are applied in the function used for the simulation.

The function obtained in this way indicates that operational mode of the component of the motor vehicle 1 which it must have in order to achieve a specific assessment of the overall vehicle behavior of the motor vehicle 1.

Under certain circumstances, interactions exist with other components of the motor vehicle 1. Known strategies of multi-variable optimization can preferably be employed in order to take such interaction into account.

On the basis of the function or functions obtained, a technical specification can now be drawn up S110a for the at least one component of the motor vehicle 1 or for the entire motor vehicle 1. In particular, the designs and/or control or regulation of the component of the motor vehicle 1 can be adapted S110b on the basis of the functions obtained. The respective component is thereby preferably designed, configured and controlled so as to reflect an actual operation of the function or respectively function parameters or coefficients as output.

In one particularly preferential exemplary embodiment, the at least one component of the motor vehicle 1 or the entire motor vehicle 1 is not only modified but also fully optimized to the optimized partial model or its function respectively.

For example, a torque model as depicted in FIGS. 3 to 11 can be optimized in respect of a wide variety of criteria relative to the driving operation of a motor vehicle 1. In order to achieve the desired target criteria values, such as for example an expected acceleration and reference acceleration or a certain broad torque level or vehicle turn response, it may for example prove necessary to electrically charge an internal combustion engine of a vehicle; i.e. run the turbocharger additionally or exclusively to an electric motor or even provide an additional electric drive in order to obtain the desired performance parameters of the criteria. This enables a completely new developmental approach in which design engineers can already be drawing conclusions in early stages of development as to how individual components of a motor vehicle 1 need to be designed with defined vehicle parameters in order to later meet criteria related to the driving operation of the motor vehicle 1.

For example, a first technical specification can be prepared by Technical Sales which establishes target values, in particular a setpoint range relative to a criterion, for example the above-cited driving dynamic parameter or at least one evaluation parameter representing the driving dynamic. On the basis of this technical specification, a second technical specification for a component can be determined by means of the inventive method which enables at least one rough design of the component of a motor vehicle 1.

FIG. 2 shows a second exemplary embodiment of the inventive system 10.

In contrast to the first exemplary embodiment, the system 10 depicted in FIG. 2 comprises only one first module 11 and one second module 12. Accordingly, there is also only one first data interface 14 with which data can be exchanged between the first module 11 and the second module 12. In contrast to the first exemplary embodiment, no evaluation parameter is computed as already discussed in conjunction with the first embodiment. Instead, the values of the at least one simulated variable for the respective driving mode parameter, by means of which the overall vehicle behavior can be characterized, are directly compared to a setpoint range for said driving mode parameter in the comparison working step S106.

If the desired target value setpoint range is not reached, the function parameter(s) of the functions used for simulation are modified using any given boundary conditions without an evaluation based on a preferably objective assignment rule being made.

FIGS. 3 to 11 will be drawn on in explaining the developing of a function-based engine model or torque model able to be used as a partial model for illustrating the operation of an internal combustion engine in the inventive method 100.

Particularly depicted with respect to FIGS. 3 to 6 is the developing of a function-based sub-model M1 which illustrates the torque characteristic of a supercharged internal combustion engine 1 in stationary and transient operating range.

Further sub-models of the function-based partial model for the engine are a partial load model M3, see FIG. 9, as well as a torque gradient model M2 and preferably also a suction torque model as well as any further sub-models as necessary.

Characteristic map-based models are customarily used in the prior art to illustrate the functioning of an engine. Thus, a characteristic map is used to illustrate the torque characteristic in the stationary and transient operation of a supercharged internal combustion engine with which the engine torque as currently applied to the crankshaft in each time step of a simulation is determined as a function of load or respectively throttle valve position and engine speed. To illustrate the transient torque build-up, for example after an erratic change in load or respectively accelerator pedal position, characteristic maps are again used for the suction torque and for the torque gradients based on the load pressure build-up of the turbocharger as a function of the initial parameters of accelerator pedal position, engine speed and load at the time of the load change. Spontaneously reached torque of a supercharged internal combustion engine, the so-called quick torque availability, is modeled with a suction torque map whereas the substantially slower torque build-up starting from suction torque up until reaching stationary torque is illustrated with an operating point-dependent torque gradient map.

An engine model consisting of these characteristic map-based sub-models in principle enables simulating with sufficient accuracy transient assessment-relevant driving modes such as for example full load acceleration, low-end torque, turning response, positive load change (tip-in), accelerating and pulling power of a motor vehicle 1.

In order to make such a characteristic map-based engine model of an automated optimization available by means of an optimization algorithm, the invention replaces individual sub-models of the characteristic map-based engine model or even all of the sub-models with function-based sub-models.

The number of variables to be varied for an efficient optimization process, thus the function parameter or respectively the coefficients of the sub-models, can thereby be reduced substantially and the function parameter or coefficients of the individual sub-models can be modified independently of each other, particularly in the context of variable optimization.

Using sub-models particularly enables the torque characteristic of the internal combustion engine to be illustrated in stationary and transient operation by way of mathematical functions having few function parameters or coefficients respectively.

Full Load Model M1

Figure 3:
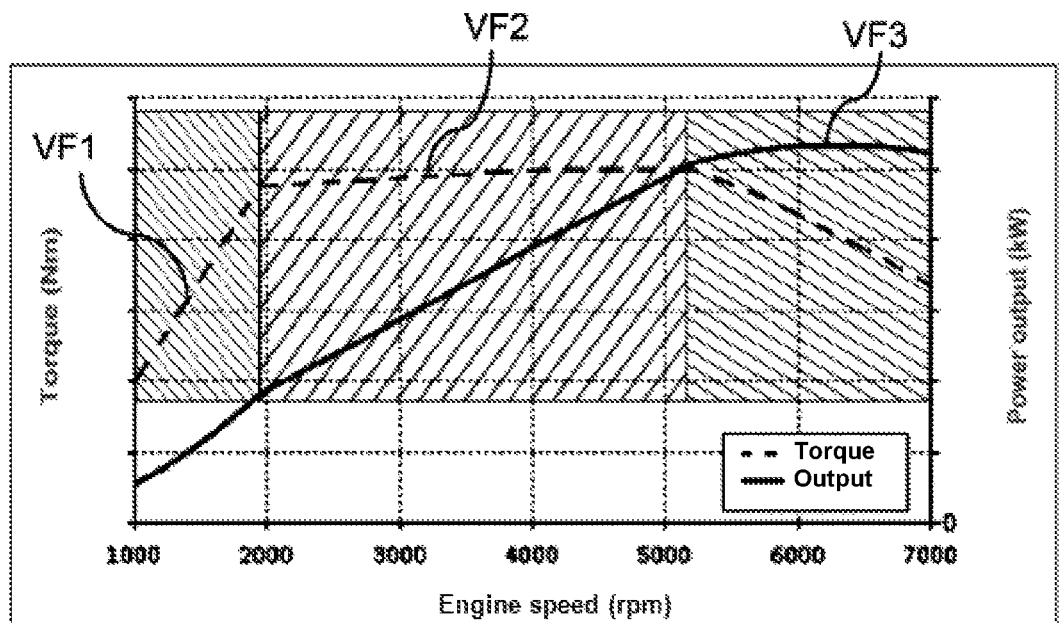

In order to develop a full load model M1 as shown in FIG. 3, the full-load characteristic of an internal combustion engine is observed in three separate segments within a speed range of the internal combustion engine. The three speed segments are identified in FIG. 3 using three different cross-hatchings. The segment up to approximately 2000 rpm can be termed the full-load segment at low engine speed, the segment up to approximately 5200 rpm the full-load segment at medium engine speed, and the segment up to approximately 7000 rpm, the full load segment at maximum power.

This classification was selected in this case so as to correspond as closely as possible to the usual behavior of modern supercharged internal combustion engines, in particular gasoline engines. Preferably also possible, however, are other classifications which are better suited to illustrating the operation of other engines.

The individual segments of the full-load characteristic are hereby specified by way of the engine speed-dependent torque or power curve.

Figure 4:
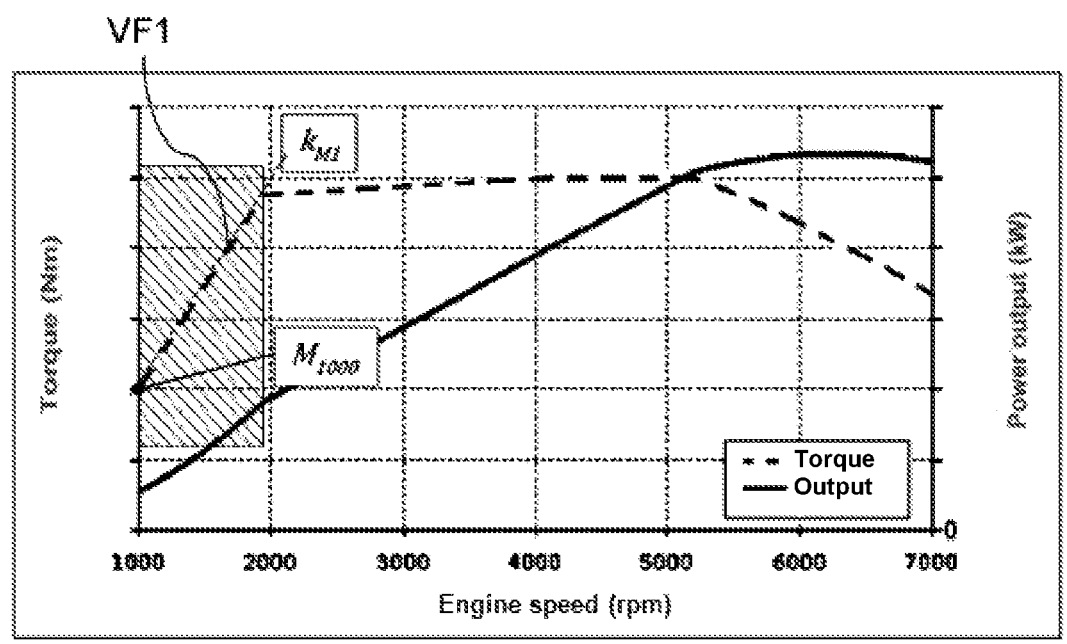
Figure 5:
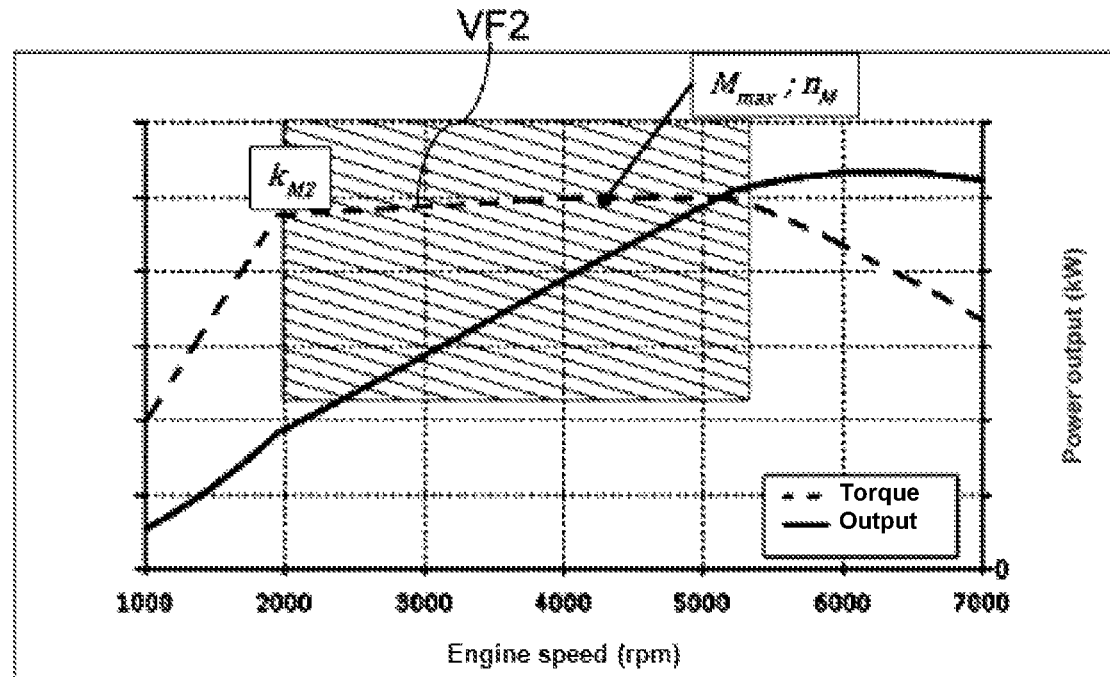
Figure 6:
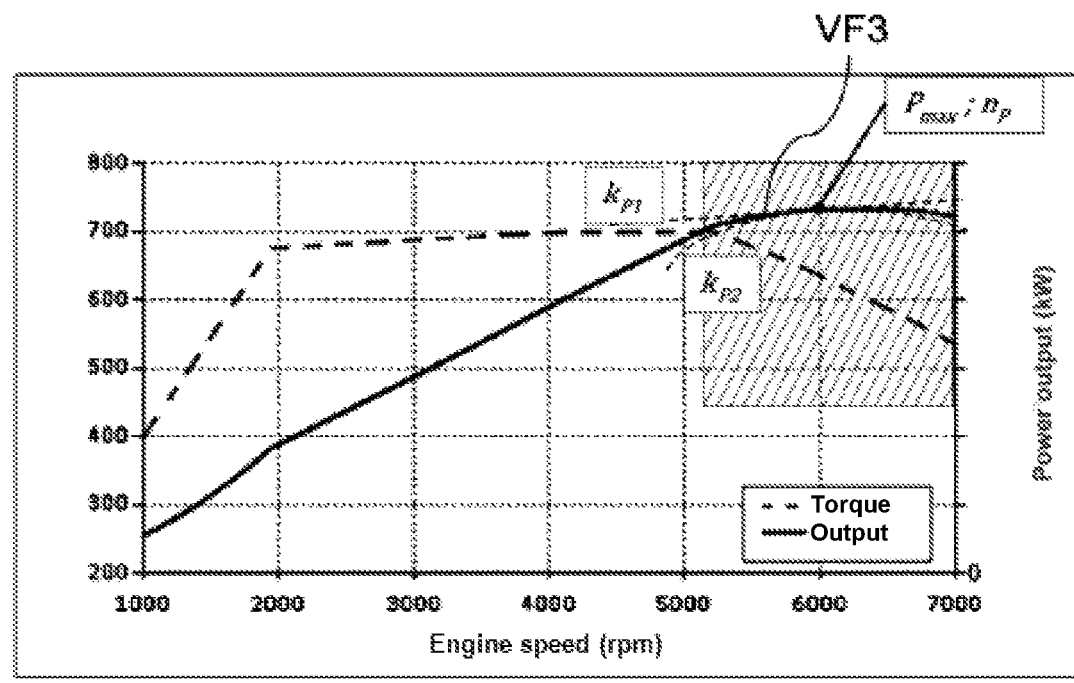

A detailed description of the individual segments with the respectively specified function parameters and mathematical formulas will be provided on the basis of FIGS. 4 to 6. General symbols are thereby used in the formulas as follows:
M=torque in Nm
P . . . =power output in kW
n . . . =rpm in min$^{-1}$ Full-Load Segment at Low Engine Speed The torque in this segment is specified by the following function VF1:

$$M_1(n) = M_{1000} + \frac{n - 1000}{1000} \cdot k_{M1}$$

The power output then accordingly results as follows:

$$P_1(n) = M_1(n) * \frac{\pi \cdot n}{30000}$$

The individual function parameters are thereby defined as follows:
$M_{1000}$=torque at 1000 min$^{-1}$
$k_{M1}$=torque increase in this segment As depicted in FIG. 4, the position and slope of the approximation function changes to the full-load characteristic subject to the values of this $M_{1000}$ and $k_{M1}$ function parameter.

Full-Load Segment at Medium Engine Speed

The torque in this segment can be specified by the following function VF2:

$$M_2(n) = M_{max} + \frac{n - n_M}{1000} \cdot k_{M2}$$

The individual function parameters in this segment are thereby defined as follows:

$M_{max}$=maximum torque
$n_M$=rpm at maximum torque
$k_{M2}$=torque increase in this segment Since with positive values of the function parameter $k_{M2}$ and at rpm greater than $n_M$, torques greater than the defined maximum torque are mathematically possible with this formula, the result is limited to $M_{max}$. The resulting function for the torque within this range is as follows:

$$M_2(n) = \min(M_2(n), M_{max})$$

Based on this function, the power output is calculated, analogously to the low rpm segment, as follows:

$$P_2(n) = M_2(n) \cdot \frac{\pi \cdot n}{30000}.$$

The approximation function to the rpm characteristic in the second segment is depicted in FIG. 5 by function parameters $M_{max}$, $n_M$ and $k_{M2}$.

Full-Load Segment at Maximum Power

Unlike with the low and medium rpm segment, it is not the torque characteristic being specified in the maximum power segment by a function with function parameters but rather the power curve.

The power curve can thereby be specified in this segment by the following function VF3:

$$P_3(n) = P_{max} + \frac{n - n_P}{1000} \cdot k_{P1} - \left(\frac{n - n_P}{1000}\right)^2 \cdot k_{P2}$$

The function parameters in this segment are thereby defined as follows:
$P_{max}$=maximum power
$n_P$=rpm at maximum power
$k_{P1}$=slope to power curve
$k_{P2}$=curvature to power curve As in the medium rpm segment, given positive values of the function parameter $k_{P1}$ and rpm greater than $n_P$, power greater than the defined maximum power of the internal combustion engine are also mathematically possible here based on the function. The result is thus also limited with respect to this function to $P_{max}$. The overall function for illustrating the power curve in this segment is therefore as follows:

$$P_3(n) = \min(P_3(n), P_{max})$$

Inversely to the low and medium rpm segment, the torque characteristic of the internal combustion engine 1 is now calculated from the power curve on the basis of the following formula:

$$M_3(n) = P_3(n) \cdot \frac{30000}{\pi \cdot n};$$

The approximation function to the power curve with the function parameters of $P_{max}$, $n_P$, $k_{P1}$ and $k_{P2}$ is depicted in the third segment in FIG. 6.

In order to obtain the complete function-based torque model, the model components of the individual segments or respectively the approximation functions underlying the model components are joined together into an overall approximation function for illustrating the entire full load curve.

This preferably ensues by identifying intersection points between approximation functions of the individual segments or by the so-called minimum principle:

$$M(n)=\min(M_1(n),M_2(n),M_3(n))$$

This principle can be fully understood on the basis of the FIG. 7 graphical representation in which the individual approximation functions VF1, VF2, VF3 of the individual segments are depicted.

Torque Gradient Model M2

In order to define the transient operational behavior of a supercharged internal combustion engine, information is needed on how quickly a turbocharger can build up a necessary charging pressure for providing a high torque. The dependency is inventively defined as torque increase per unit of time and is a function subject to the respectively given engine speed.

The torque gradient is thus preferably inventively specified as a function of the engine speed by the following functions:

$$x = \frac{n - 1000}{4000}$$

$$y = x \cdot (1 - prog) + x^3 \cdot prog$$

$$\text{Gradient}(n) = y \cdot (grad_5 - grad_1) + grad_1$$

The torque gradient function is hereby defined by the following function parameters:
$grad_1$=torque gradient at 1000 min$^{-1}$
$grad_5$=torque gradient at 5000 min$^{-1}$
prog=progression factor
x, y=auxiliary variables The auxiliary variables x and y serve only in simplifying the calculation.

The "prog" function parameter of the torque gradient function can be adjusted in a range of 0 to 1 and influences the ratios in the above functions to which the torque gradient function is composed of a linear component and a cubic component.

An inventive approximation function for the torque gradient is depicted in FIG. 8. The torque gradient value is thereby depicted for each engine speed during a pedal jump from 0 to 100%. The $grad_1$, $grad_5$ and prog function parameter are likewise depicted in FIG. 8. With respect to the prog function parameter, it is also evident from the arrows how a change in this function parameter affects the course of the torque gradient function.

Partial Load Model M3

The partial load range of a supercharged internal combustion engine depends in particular on the internal combustion engine's pedal characteristic. This defines the correlation between an accelerator pedal position and a torque demand.

Therefore, a function-based partial load model is preferably determined on the basis of a function-based pedal characteristic. Such a function-based pedal characteristic is a percentage, with the help of which the full-load characteristic can be scaled according to the pedal position. The function-based pedal characteristic is inventively specified by the following functions:

$$x = \frac{\text{Pedal}}{100}$$

$$sShape = \left(\left(\frac{3}{8} \cdot (2x-1)^5 - \frac{5}{4} \cdot (2x-1)^3 + \frac{15}{8} \cdot (2x-1)\right) + 1\right) \cdot 50$$

$$\text{offset} = (1 - (2x-1)^2) \cdot \text{shift}$$

$$\%\text{ Moment} = \text{Pedal} \cdot \text{linear} + sShape \cdot (1 - \text{linear}) + \text{offset}$$

The mathematical result according to this function can also take values below 0% or above 100%. The result therefore needs to be limited to a valid range of values.

An actual pedal characteristic moreover exhibits an engine speed dependency. For this reason, the two function parameters of the "linear" and "shift" pedal characteristic function are specified as engine speed-dependent functions. To that end, the values of the function parameters are defined at three different engine speeds and the course of the pedal characteristic function then interpolated with a quadratic polynomial.

The progression of such a pedal characteristic function is thereby depicted in FIG. 9 with the "shift" and "linear" function parameters.

The function-based pedal characteristic model thereby exhibits the following function parameters:
linear=linearity
shift=shift The arrow in FIG. 9 indicates how the approximation function of the pedal characteristic shifts upon a respective change in "shift" and "linear" function parameter. A direct response to an accelerator pedal position (straight dotted line) will thereby be perceived by a driver as rather sporty; in contrast, a more progressive curve of low torque requirement in the lower accelerator pedal position range and higher torque requirement in the upper accelerator pedal position range will be perceived as rather equable.

FIG. 10 depicts the engine speed dependency of the function parameter of the pedal characteristic function, with the different progressions of the pedal characteristic function being depicted for different engine speeds.

Lastly, FIG. 11 shows an inventive partial load model M3 which was calculated from the inventive function-based full load characteristic model and the inventive function-based pedal characteristic model.

In order to achieve better driving capability, it is preferable in calculating the partial-load approximation function at low speeds not to scale the current full load torque but rather the maximum torque. Otherwise, the breaks in the full load characteristic at approximately 2000 min$^{-1}$ and 4000 min$^{-1}$ would also be reflected in the partial load characteristics.

Accordingly modified, the depicted sub-models and their model components for full load models M1, torque gradient models M2 and partial load models M3 can also be carried over to non-charged internal combustion engines. Other partial models can be accordingly function-based created for other drive systems, for example electric motors, and for other components of the vehicle, for example the steering or the transmission, so as to be able to be optimized with the inventive method 100.

It should furthermore be noted that the exemplary embodiments as depicted are merely examples which are in no way to be construed as limiting the protective scope of the invention's application and structure. Rather, the foregoing description gives the skilled person a guide in implementing at least one exemplary embodiment, whereby various modifications, particularly with respect to the function and arrangement of the described components, may be made without departing from the invention's scope of protection as yielded by the claims with these equivalent feature combinations.

LIST OF REFERENCE NUMERALS 1 motor vehicle
10 system
11 first module
12 second module
13 third module
14 first interface
15 second interface
16 third interface
M model
M1, M2, M3 partial model

What is claimed is:

1. A method for simulation-based analysis or optimization of a motor vehicle, comprising:
   simulating a driving operation of the motor vehicle on the basis of a function-based model with at least one manipulated variable for acquiring values of at least one simulated variable suitable for characterizing an overall vehicle behavior of the motor vehicle, wherein the function-based model comprises at least one partial model, wherein the at least one partial model is based on a first function that characterizes an operation of a drive apparatus of the motor vehicle, wherein the at least one partial model is a torque model of the drive apparatus of the motor vehicle, and wherein the at least one partial model comprises at least one of the following sub-models:
   a full load model based on a full-load function, whereby at low engine speed and medium engine speed the full-load function is approximated by torque, while at maximum power the full-load function is approximated by a curve to power;
   a torque gradient model based on a torque gradient function which has a linear portion and a cubic portion, and wherein a function parameter of the torque gradient model indicates a weighting of the linear portion and the cubic portion; and
   a partial-load model based on a partial-load function which is calculated based on the full-load function and a pedal characteristic function, wherein the pedal characteristic function indicates a correlation between a torque variable and a pedal variable or a throttle valve position variable; and
   outputting the values of the at least one simulated variable.

2. The method according to claim 1, further comprising:
   determining one or more driving mode parameters defined in relation to one or more values of the at least one simulated variable and the at least one manipulated variable, the one or more driving mode parameters characterizing at least one driving mode, and wherein the values of the at least one simulated variable are output in conjunction with a respective driving mode parameter of the one or more driving mode parameters.

3. The method according to claim 1, wherein the at least one partial model is based on a second function comprising at least one function parameter, and wherein modifying the at least one function parameter allows the simulated driving operation of the motor vehicle to be modifiable.

4. The method according to claim 2, wherein the respective driving mode parameter is defined by at least one predetermined condition in relation to at least one of the at least one manipulated variable and the at least one simulated variable.

5. The method according to claim 1, wherein simulating the driving operation is performed for various points of an experimental design.

6. The method according to claim 2, further comprising:
   determining at least one evaluation parameter value of at least one evaluation parameter, wherein the at least one evaluation parameter indicates the overall vehicle behavior of the motor vehicle based on an assignment rule dependent on one or more of the at least one simulated variable and the respective driving mode parameter; and
   outputting the at least one evaluation parameter value.

7. The method according to claim 6, further comprising:
   preparing a first technical specification with respect to the driving operation of the motor vehicle, wherein the first technical specification corresponds to a setpoint range for the respective driving mode parameter or an evaluation parameter of the at least one evaluation parameter corresponding to target values for design criteria for the overall vehicle behavior of the motor vehicle.

8. The method according to claim 7, further comprising:
   optimizing the at least one partial model based on the first function in relation to the setpoint range for the respective driving mode parameter or the evaluation parameter corresponding to the target values for the design criteria for the overall vehicle behavior of the motor vehicle.

9. The method according to claim 6, further comprising:
   adapting the one or more values of the at least one simulated variable for the respective driving mode parameter or the at least one evaluation parameter to a predefined setpoint range; and
   modifying at least one function parameter of a second function of the at least one partial model used for the simulated driving operation if the adapted one or more values of the at least one simulated variable or the at least one evaluation parameter lie outside of the predefined setpoint range, wherein the method repeats the simulating of the driving operation; and/or
   outputting a value of the at least one function parameter of the second function of the at least one partial model used for the simulated driving operation if the adapted one or more values of the at least one simulated variable or the at least one evaluation parameter lie within the predefined setpoint range.

10. The method according to claim 9, wherein the modification of the at least one function parameter of the second function occurs based on an optimization algorithm, and wherein the at least one function parameter of the second function used for the simulated driving operation is treated in the optimization algorithm as the at least one manipulated variable of the drive apparatus or the motor vehicle.

11. The method according to claim 3, further comprising:
   generating an experimental design which comprises points of variation in regard to the at least one function parameter of the second function used for the simulated driving operation based on an optimization algorithm, wherein the simulated driving operation occurs based on the experimental design.

12. The method according to claim 9, further comprising:
   defining a second technical specification for the drive apparatus or the motor vehicle based on the second function used for the simulated driving operation or the value of the at least one function parameter.

13. The method according to claim 12, wherein the at least one partial model characterizes the drive apparatus of the motor vehicle, and the method further comprises:
designing or modifying a design, a control, or a regulation of the drive apparatus or the motor vehicle based on the second function used for the simulated driving operation or the value of the at least one function parameter.

14. The method according to claim 1, wherein the torque model comprises at least the full load model, and wherein the full-load function specifies a full-load characteristic based on three subfunctions:
a first full-load function subfunction at the low engine speed;
a second full-load function subfunction at the medium engine speed; and
a third full-load function subfunction at the maximum power.

15. The method according to claim 1, wherein the pedal characteristic function comprises a first function parameter and a second function parameter, wherein the first and second function parameters are speed-dependent, and wherein the first function parameter indicates a first factor and the second function parameter indicates an offset.

16. The method according to claim 1, wherein the at least one partial model comprises at least one function parameter as a manipulated variable, by the manipulating of which the simulated driving operation of the motor vehicle can be changed.

17. The method according to claim 6, wherein one or more of the respective driving mode parameter and the at least one evaluation parameter is determined as a function of a vehicle parameter.

18. The method according to claim 1, wherein the model comprises a vehicle model as a further partial model, and wherein the further partial model is configured to at least partly characterize a driving characteristic of the motor vehicle.

19. The method according to claim 1, further comprising:
providing vehicle parameters with respect to the motor vehicle, wherein the driving operation of the motor vehicle is simulated by a vehicle model.

20. A non-transitory computer readable medium containing instructions which when executed by a computer cause the computer to perform a method comprising:
simulating a driving operation of the motor vehicle on the basis of a function-based model with at least one manipulated variable for acquiring values of at least one simulated variable suitable for characterizing an overall vehicle behavior of the motor vehicle, wherein the function-based model comprises at least one partial model, wherein the at least one partial model is based on a first function that characterizes an operation of at least one component of the motor vehicle, and wherein the at least one partial model comprises a partial-load model based on a partial-load function which is calculated based on a full-load function and a pedal characteristic function, wherein the pedal characteristic function indicates a correlation between a torque variable and a pedal variable or a throttle valve position variable; and
outputting the values of the at least one simulated variable.

21. A system for simulation-based analysis or optimization of a motor vehicle, comprising:
a first module configured to simulate a driving operation of the motor vehicle on the basis of a function-based model with at least one manipulated variable for acquiring values of at least one simulated variable suitable for characterizing an overall vehicle behavior of the motor vehicle, wherein the function-based model comprises at least one partial model, wherein the at least one partial model is based on a first function that characterizes an operation of at least one component of the motor vehicle, and wherein the at least one partial model comprises a partial-load model based on a partial-load function which is calculated based on a full-load function and a pedal characteristic function, wherein the pedal characteristic function indicates a correlation between a torque variable and a pedal variable or a throttle valve position variable;
a second module configured to output the values of the at least one simulated variable, wherein the first module and the second module are connected by a first data interface; and
hardware configured to perform at least one of the first module and the second module.

22. The system according to claim 21, wherein the second module is configured to determine one or more driving mode parameters defined in relation to one or more values of the at least one simulated variable and the at least one manipulated variable, the one or more driving mode parameters characterizing at least one driving mode, and wherein the one or more values of the at least one simulated variable are output in conjunction with a respective driving mode parameter of the one or more driving mode parameters.

23. The system according to claim 21, wherein the at least one partial model is based on a second function comprising at least one function parameter, and wherein modifying the at least one function parameter allows the simulated driving operation of the motor vehicle to be modifiable.

24. The system according to claim 21, wherein the first data interface is configured to furnish:
vehicle parameters and values of at least one of the at least one manipulated variable and the at least one simulated variable from the first module to the second module; and
values of a function parameter and points of variation from the second module to the first module.

25. The system according to claim 22, wherein the second module is configured to determine at least one evaluation parameter, wherein the at least one evaluation parameter indicates the overall vehicle behavior of the motor vehicle based on an assignment rule dependent on one or more of at least one output simulated variable and the respective driving mode parameter, and wherein the second module is further configured to output the at least one evaluation parameter.

26. The system according to claim 25, wherein the second module is configured to prepare a first technical specification with respect to the driving operation of the motor vehicle, wherein the first technical specification corresponds to a setpoint range for the respective driving mode parameter or an evaluation parameter of the at least one evaluation parameter corresponding to target values for design criteria for the overall vehicle behavior of the motor vehicle.

27. The system according to claim 26, wherein the second module is configured to optimize the at least one partial model based on the first function in relation to setpoint range for the respective driving mode parameter or the evaluation parameter corresponding to the target values for the design criteria for the overall vehicle behavior of the motor vehicle.

28. The system according to claim 25, wherein the second module is further configured to:

adapt the one or more values of the at least one simulated variable output for the respective driving mode parameter to a predefined setpoint range;

modify at least one function parameter of a second function of the at least one partial model used for the simulated driving operation if the adapted one or more values of the at least one output simulated variable lie outside of the predefined setpoint range, wherein the first module is configured to repeat the simulating of the driving operation; and/or output a value of the at least one function parameter if the adapted one or more values of the at least one output simulated variable lie within the predefined setpoint range.

29. The system according to claim 25, further comprising a third module that is connected to the second module via a second data interface and to the first module via a third data interface, wherein the third module is configured to:

adapt the at least one evaluation parameter to a predefined setpoint range;

modify at least one function parameter of a second function of the at least one partial model used for the simulated driving operation if the at least one adapted evaluation parameter lies outside of the predefined setpoint range, wherein the first module is configured to repeat the simulating of the driving operation; and/or output a value of the at least one function parameter if the at least one adapted evaluation parameter lies within the predefined setpoint range.

30. The system according to claim 29, wherein the second data interface is configured to furnish values of the at least one evaluation parameter from the second module to the third module and the third data interface is configured to furnish the values of the at least one function parameter and points of variation from the third module to the first module.

31. The system according to claim 29, wherein the second module or the third module is configured to generate an experimental design which comprises the points of variation in regard to the at least one function parameter of the second function used for the simulation based on an optimization algorithm, wherein the simulation occurs based on the experimental design.

* * * * *